United States Patent
Solh et al.

(10) Patent No.: US 10,083,352 B1
(45) Date of Patent: Sep. 25, 2018

(54) PRESENCE DETECTION AND DETECTION LOCALIZATION

(71) Applicant: Amazon Technologies, Inc., Seattle, WA (US)

(72) Inventors: Mashhour Solh, San Jose, CA (US); Lelin Zhang, San Jose, CA (US); Jinglun Gao, Milpitas, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/631,449

(22) Filed: Jun. 23, 2017

Related U.S. Application Data

(63) Continuation-in-part of application No. 15/601,752, filed on May 22, 2017.

(51) Int. Cl.
  *G06K 9/00* (2006.01)
  *G06K 9/32* (2006.01)
  *G06K 9/20* (2006.01)

(52) U.S. Cl.
  CPC ..... *G06K 9/00362* (2013.01); *G06K 9/00335* (2013.01); *G06K 9/20* (2013.01); *G06K 9/3241* (2013.01); *G06T 2207/30196* (2013.01)

(58) Field of Classification Search
  CPC .......................................... G06T 2207/30196
  See application file for complete search history.

(56) References Cited

U.S. PATENT DOCUMENTS

| | | | |
|---|---|---|---|
| 6,456,737 B1 * | 9/2002 | Woodfill | G06K 9/32 348/47 |
| 9,224,060 B1 * | 12/2015 | Ramaswamy | G06K 9/00912 |
| 9,538,158 B1 * | 1/2017 | Rush | A61B 5/002 |
| 2009/0097711 A1 * | 4/2009 | Chen | G06K 9/00228 382/103 |
| 2013/0176430 A1 * | 7/2013 | Zhu | G06T 7/2053 348/143 |
| 2015/0055821 A1 * | 2/2015 | Fotland | G06K 9/3241 382/103 |
| 2017/0249501 A1 * | 8/2017 | Van der Sijde | G06K 9/00255 |

OTHER PUBLICATIONS

Choi. "Human Detection Based on the Generating of a Background Image by Using a Far-Infrared Light Camera" Sensor, ISSN 1424-8220. Mar. 9, 2015.*

* cited by examiner

*Primary Examiner* — Oneal R Mistry
(74) *Attorney, Agent, or Firm* — Pierce Atwood LLP

(57) ABSTRACT

A system configured to improve human presence detection and/or localization by generating aggregate confidence values. The system may aggregate confidence values corresponding to overlapping regions of interest. The system may perform human presence detection by comparing the aggregate confidence values to a universal threshold, with aggregate confidence values above the universal threshold indicating that human presence is detected. The system may use the aggregate confidence values to generate a heatmap, may identify a strongest cluster of pixels in the heatmap and determine a bounding box surrounding the strongest cluster. To reduce false positive detections, the system may track the false positive detections as heatmap base data and may remove the heatmap base data from the heatmap. Thus, pixel intensity values corresponding to the false positive detections may be reduced to improve an accuracy of the human presence detection.

20 Claims, 23 Drawing Sheets

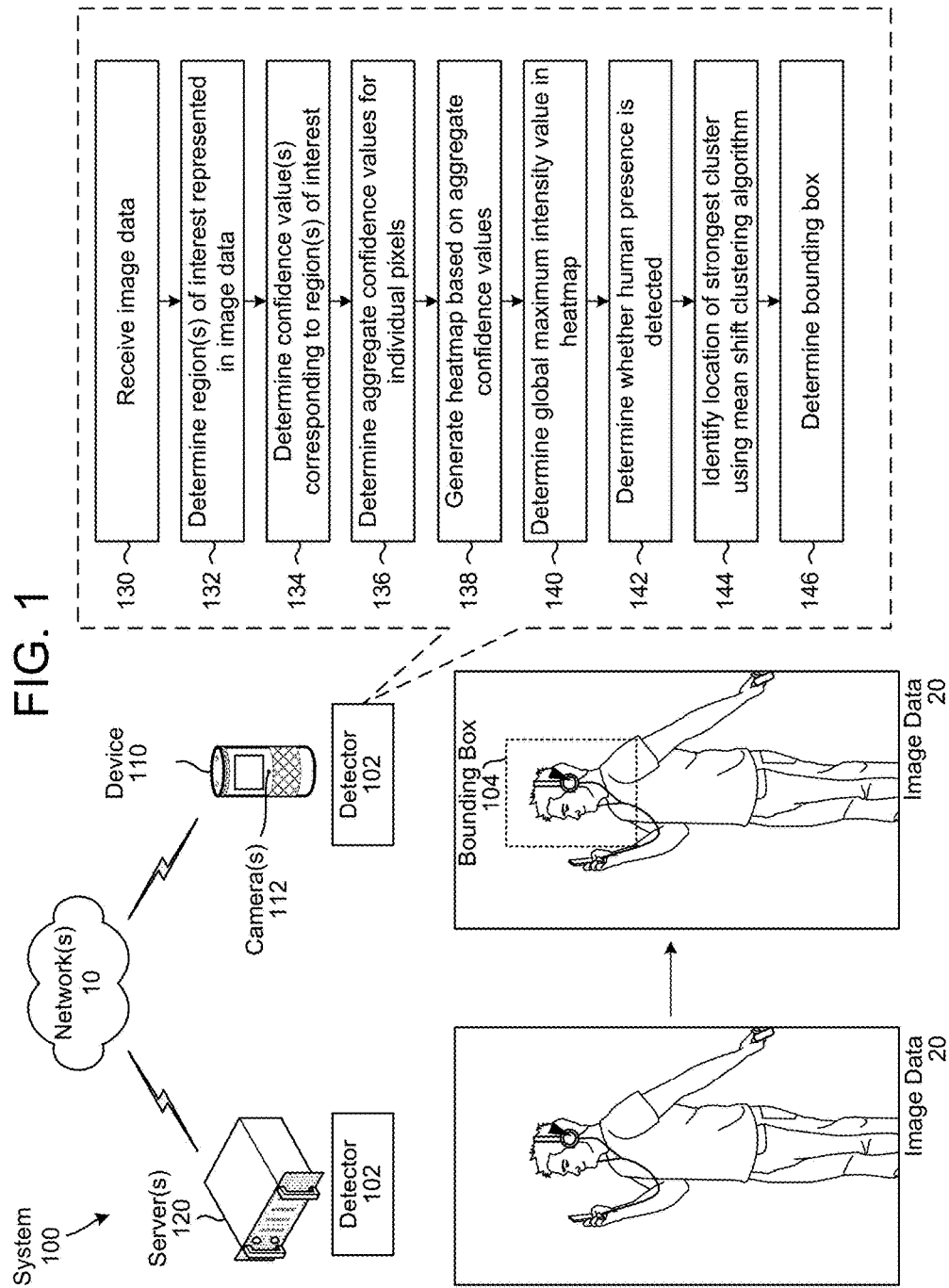

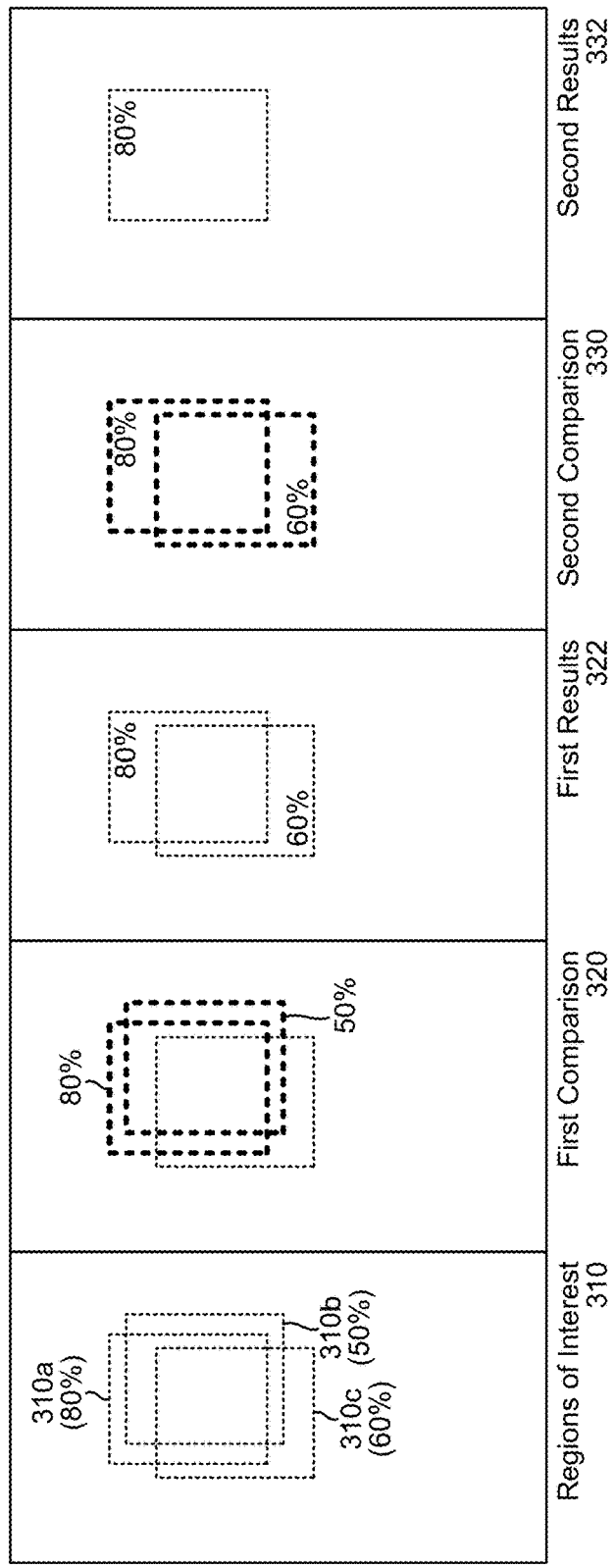

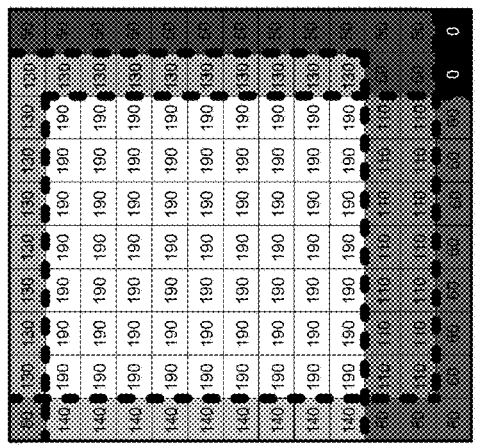
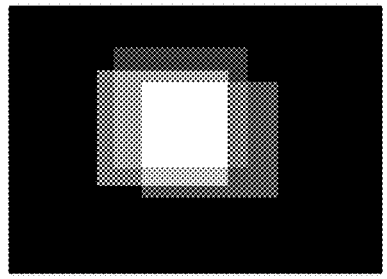
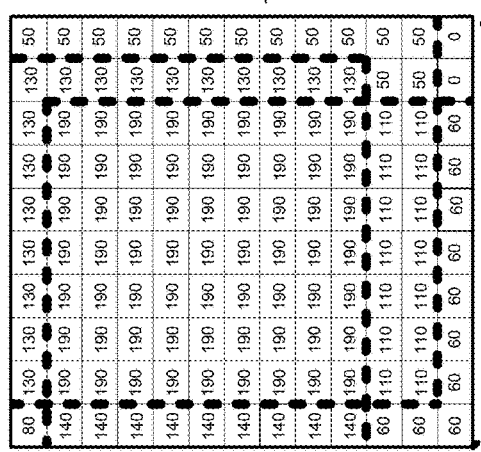
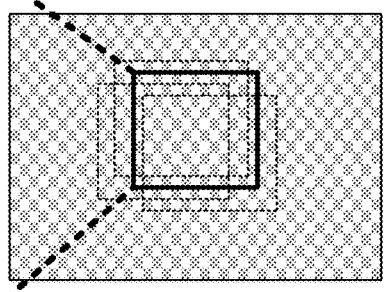
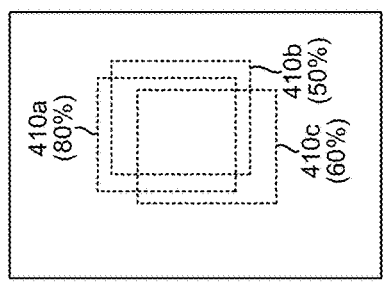
FIG. 4

FIG. 5A
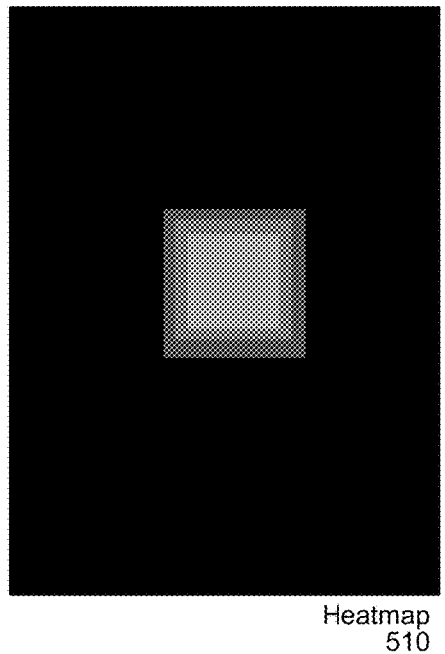
Heatmap
510
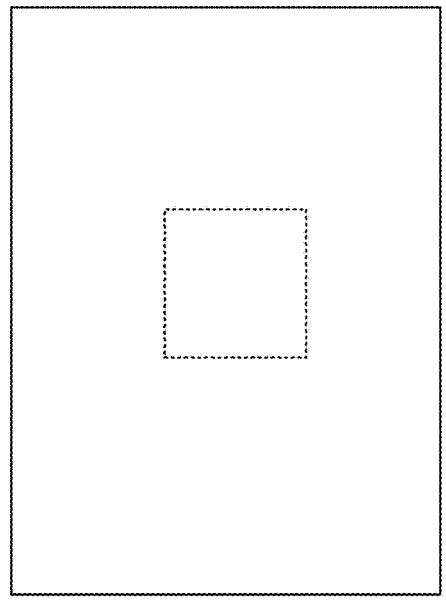
Bounding Box
512
FIG. 5B
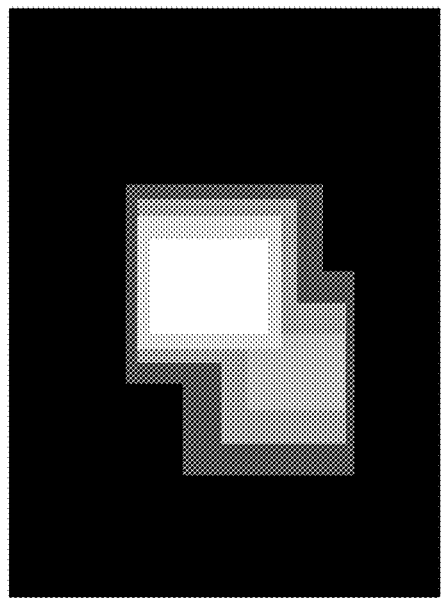
Heatmap
520
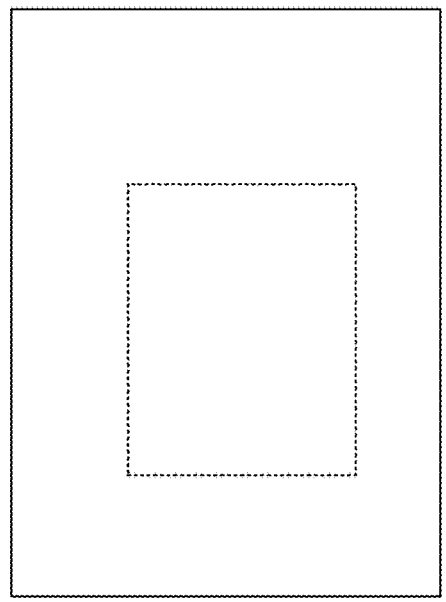
Bounding Box
522

FIG. 5C
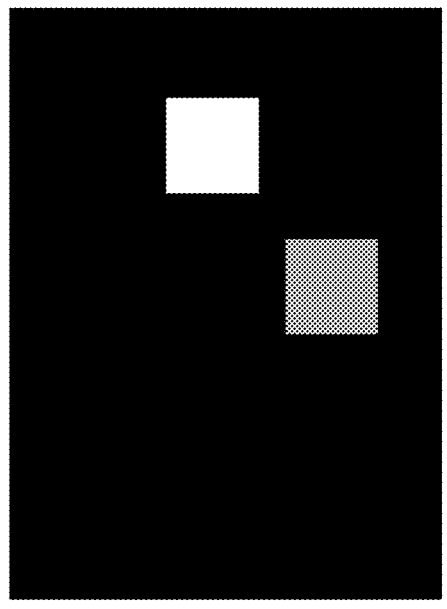
Heatmap
530
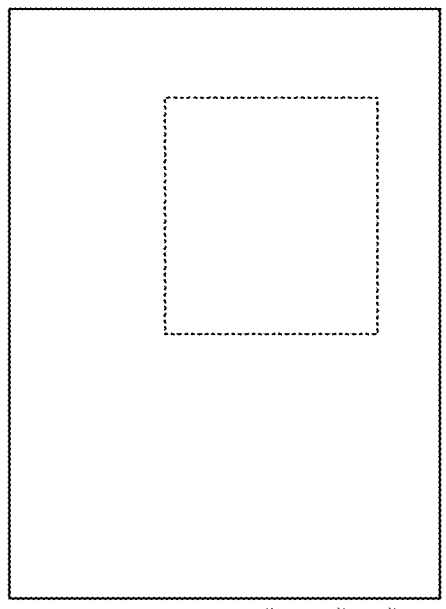
Bounding Box
532
FIG. 5D
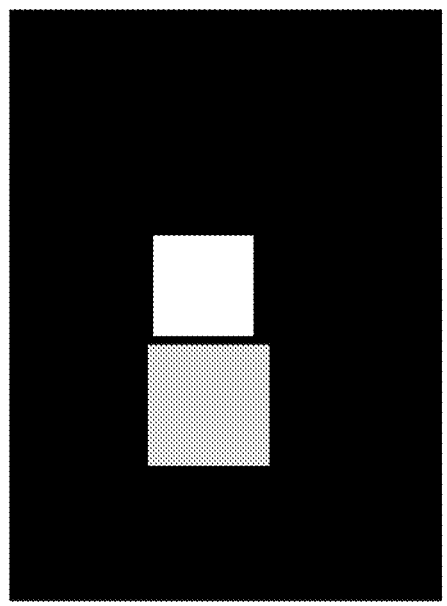
Heatmap
540
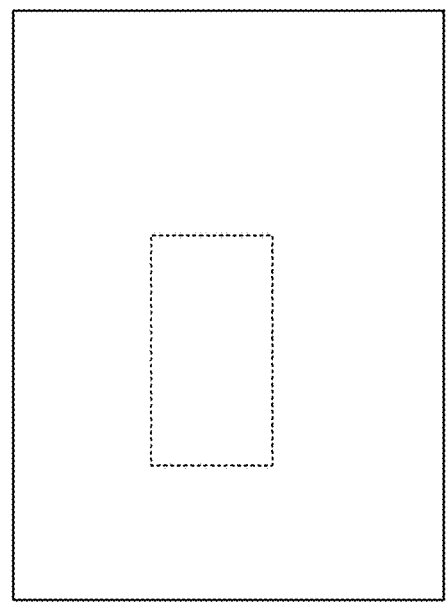
Bounding Box
542

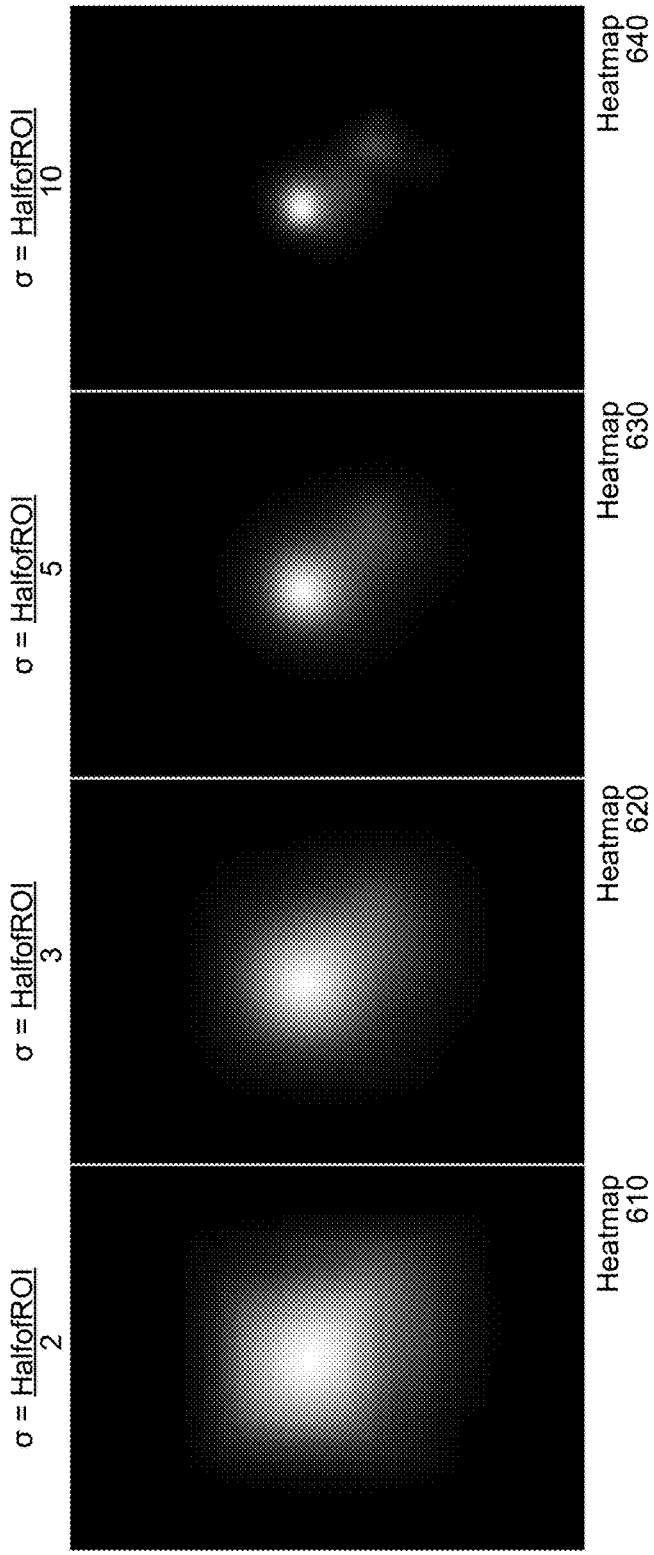

FIG. 7A
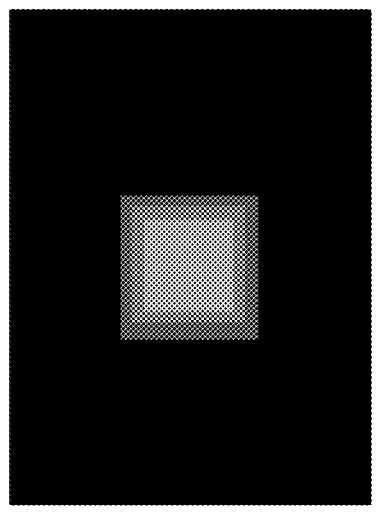
Heatmap
510
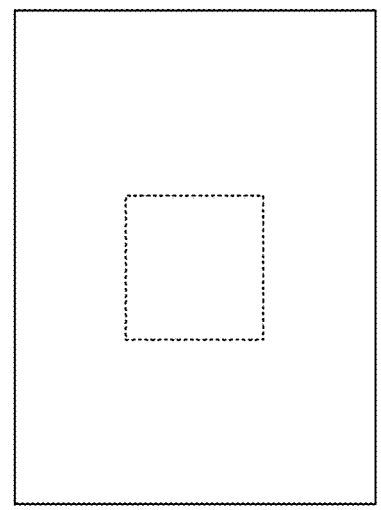
Bounding Box
512
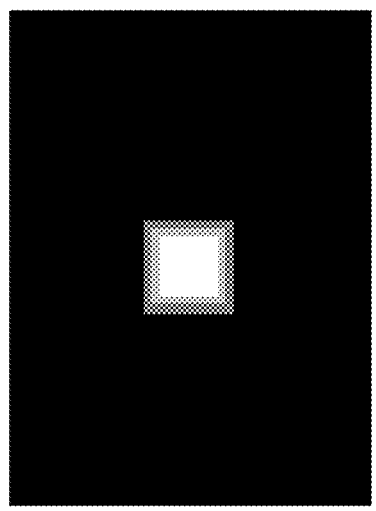
Heatmap
710
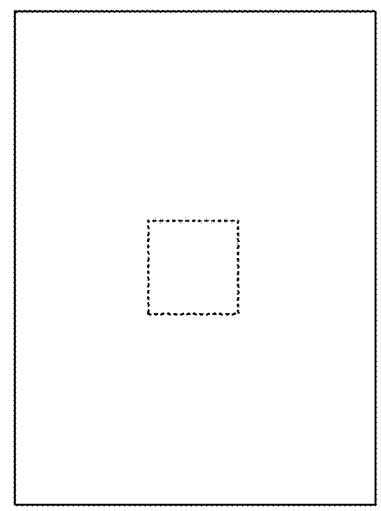
Bounding Box
712

FIG. 7B
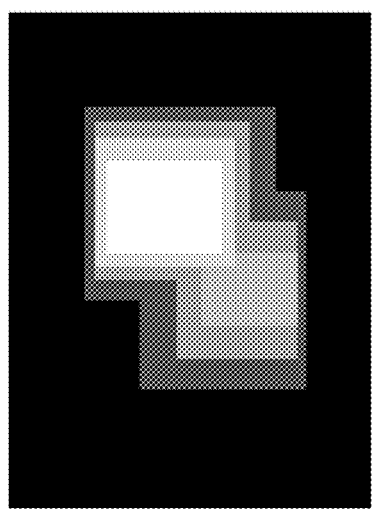
Heatmap
520
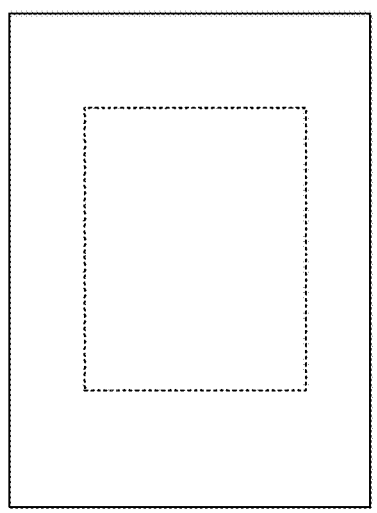
Bounding Box
522
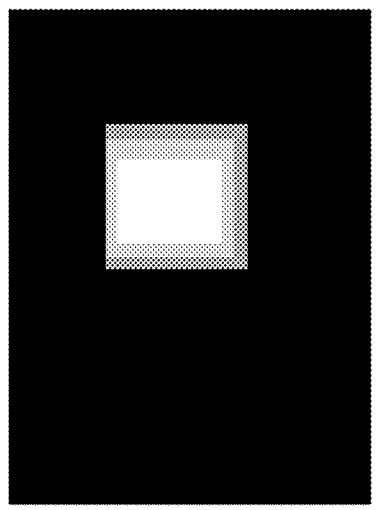
Heatmap
720
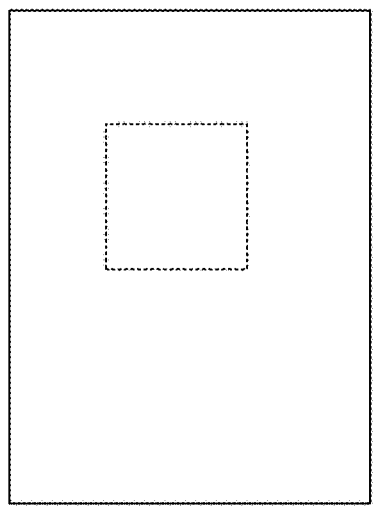
Bounding Box
722

FIG. 7C
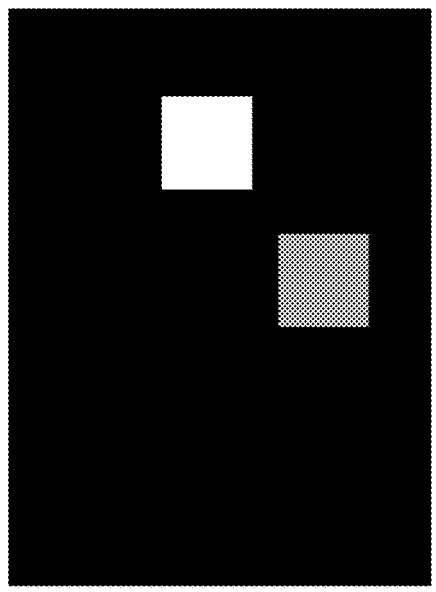
Heatmap
530
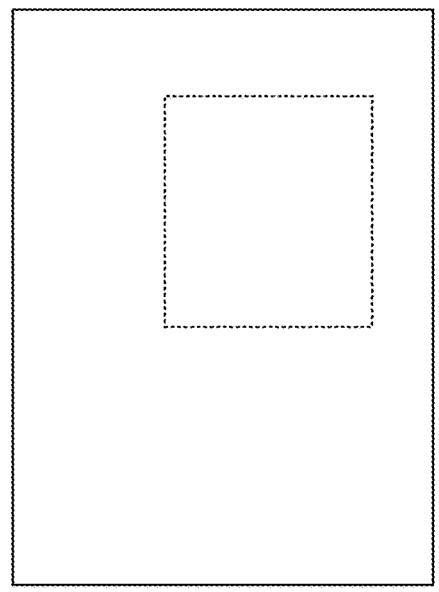
Bounding Box
532
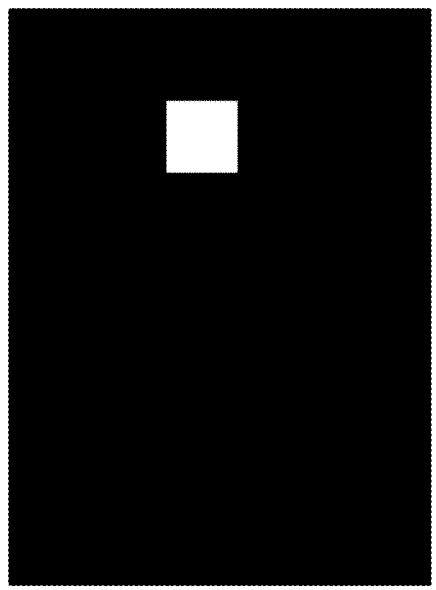
Heatmap
730
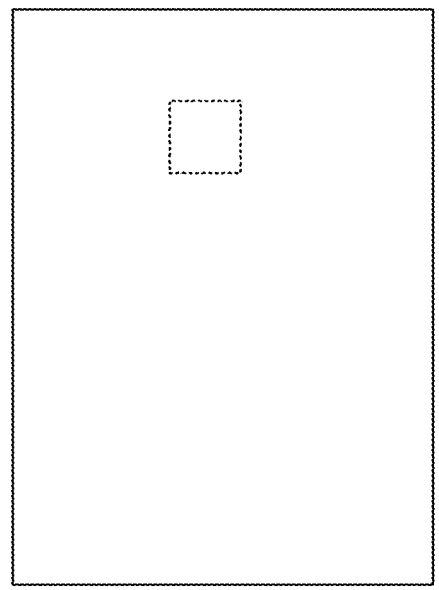
Bounding Box
732

FIG. 7D
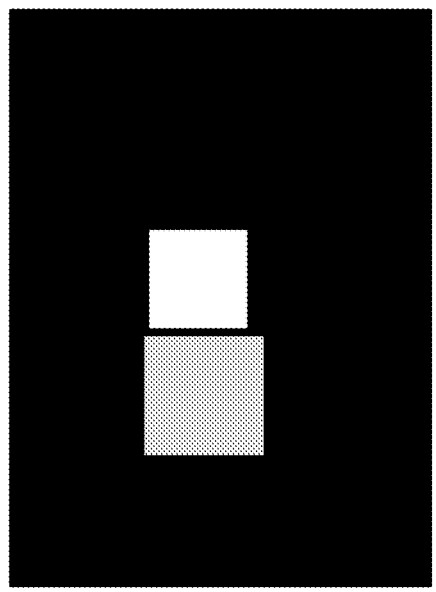
Heatmap
540
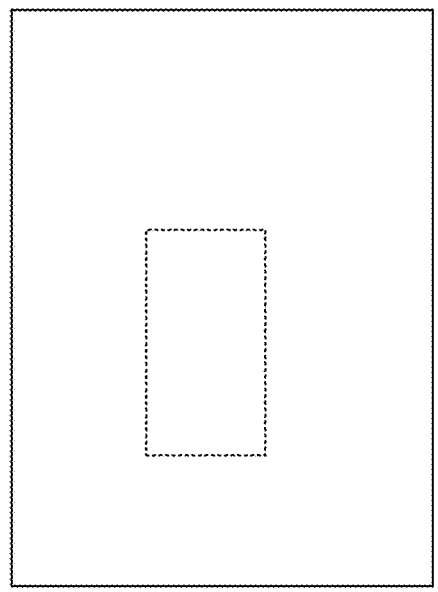
Bounding Box
542
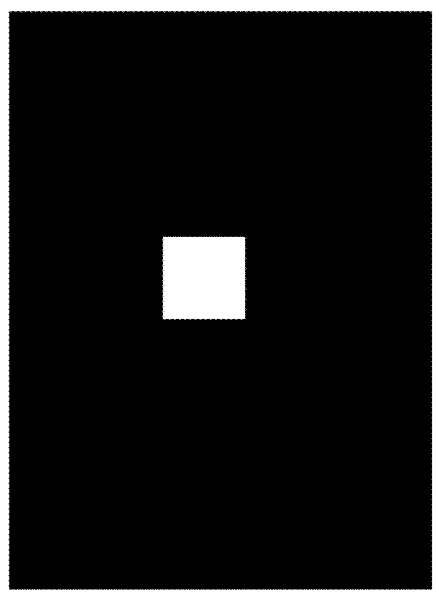
Heatmap
740
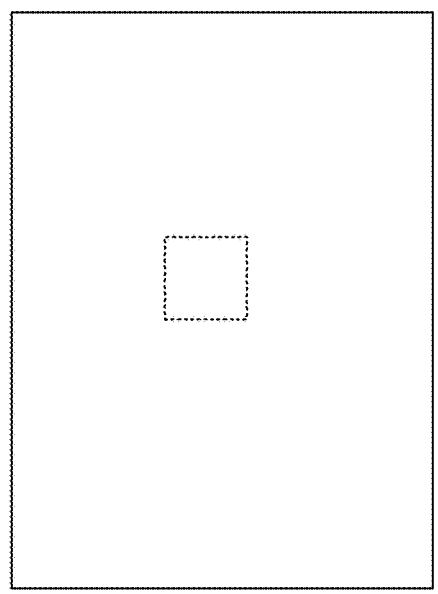
Bounding Box
742

FIG. 13
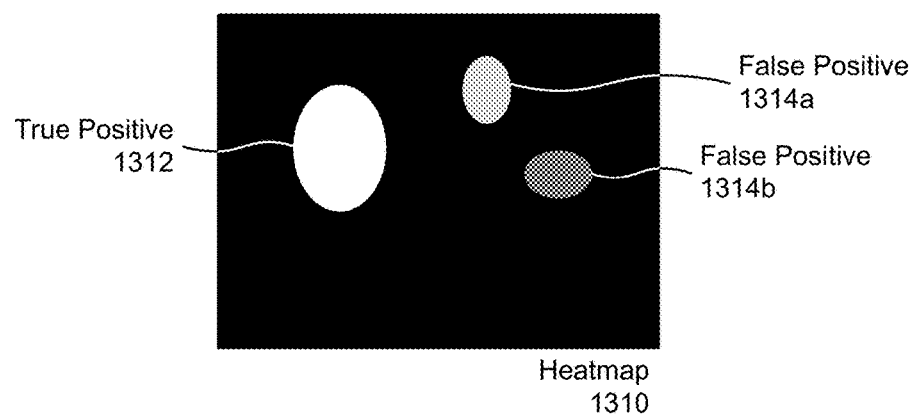
Heatmap
1310
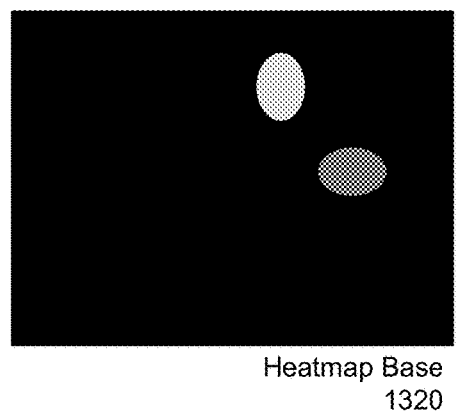
Heatmap Base
1320
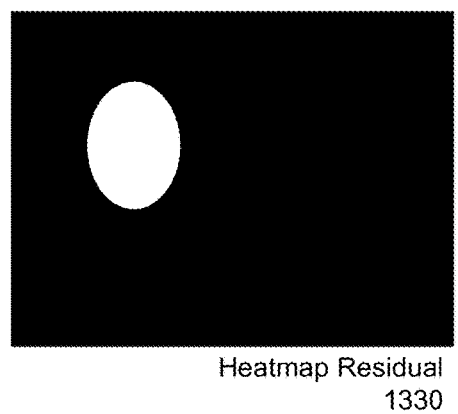
Heatmap Residual
1330

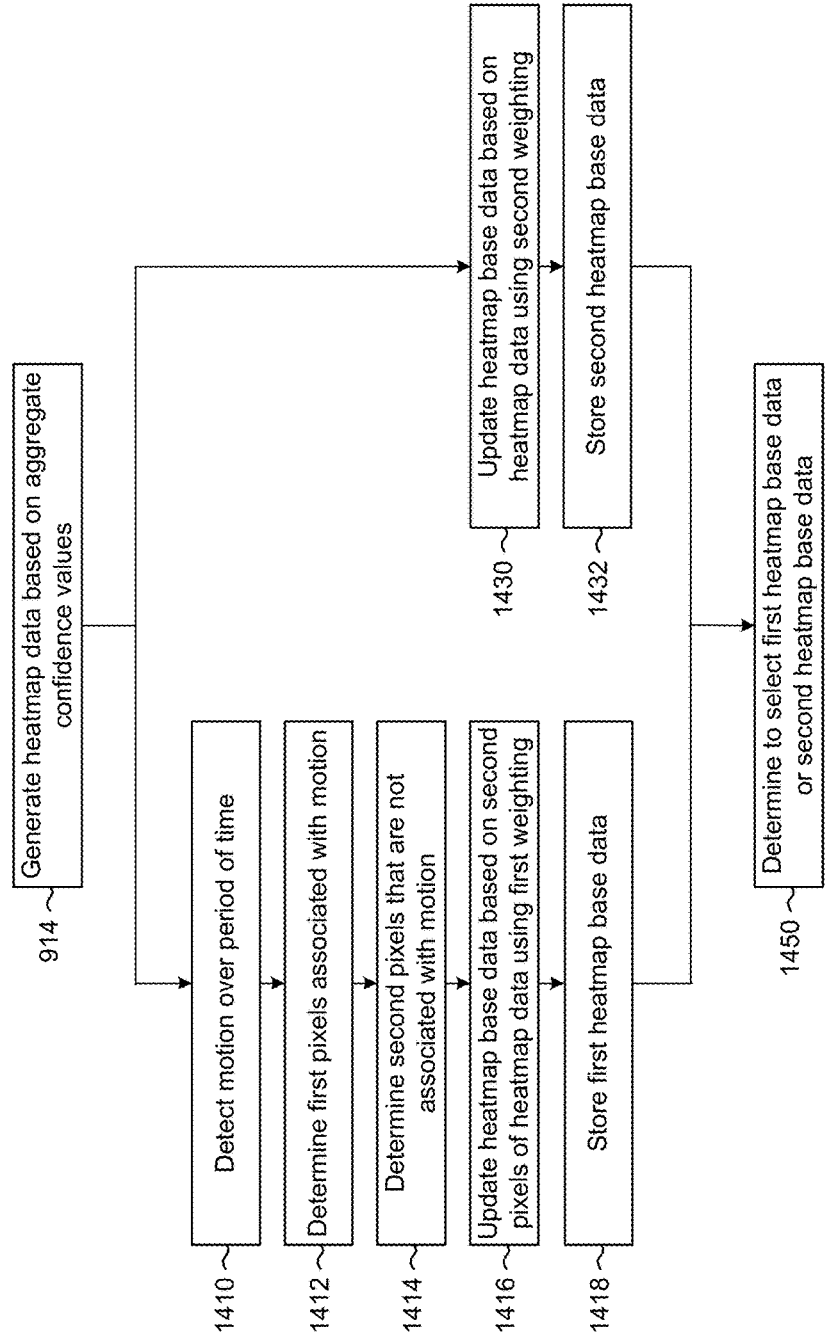

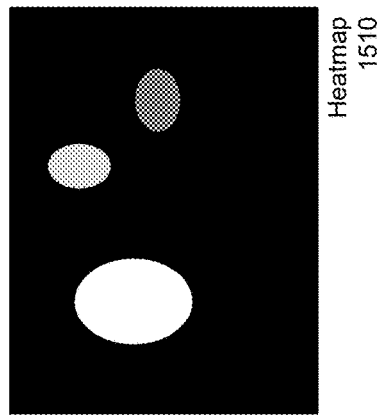
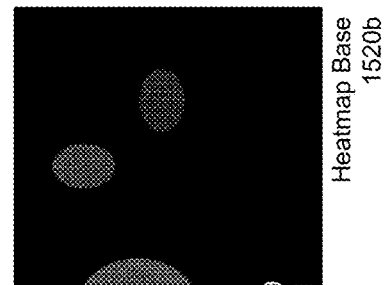
FIG. 15A  FIG. 15B
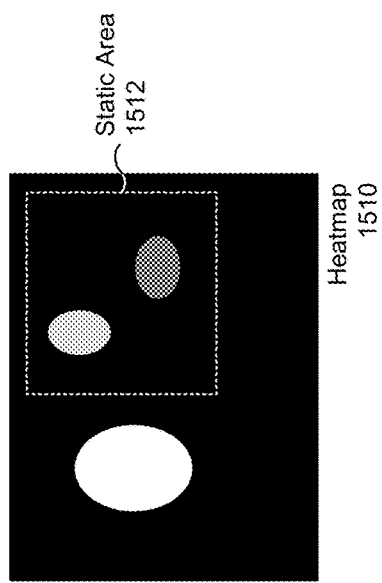
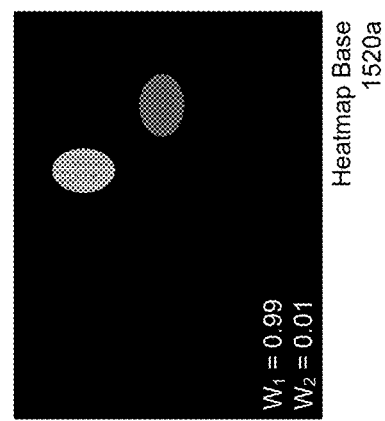

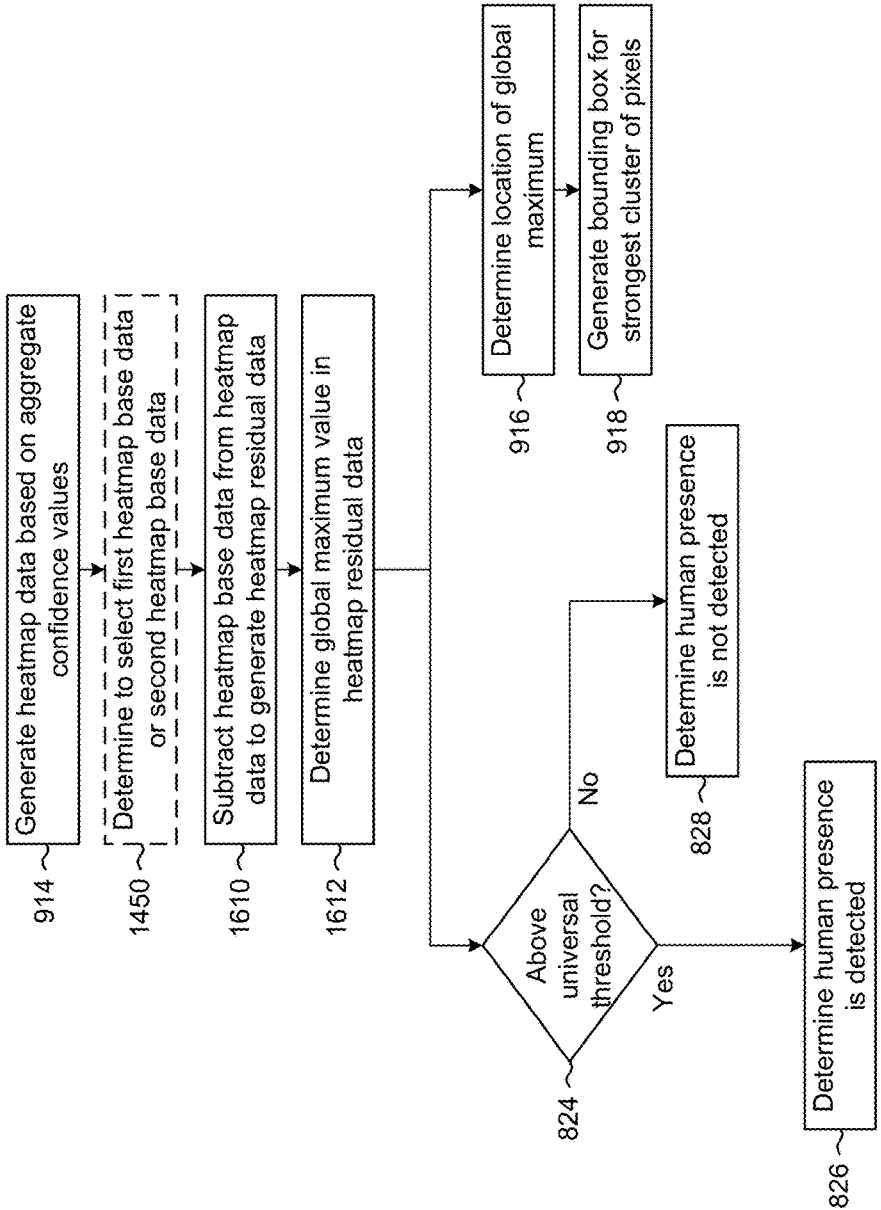

PRESENCE DETECTION AND DETECTION LOCALIZATION

CROSS-REFERENCE TO RELATED APPLICATION

This application is a continuation-in-part of, and claims the benefit of priority of, U.S. Non-provisional patent application Ser. No. 15/601,752, filed May 22, 2017 and entitled "PRESENCE DETECTION AND DETECTION LOCALIZATION," the contents of which is expressly incorporated herein by reference in its entirety.

BACKGROUND

With the advancement of technology, the use and popularity of electronic devices has increased considerably. Electronic devices are commonly used to capture and process image data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIG. 3 illustrates an example of selecting a region of interest having a highest confidence value from overlapping regions of interest.

FIG. 4 illustrates an example of aggregating confidence values from multiple regions of interest and generating a heatmap according to examples of the present disclosure.

FIG. 5A-5D illustrate examples of true detections being disturbed by false detections and a resulting bounding box according to examples of the present disclosure.

FIG. 6 illustrates examples of finding a global maximum using a mean shift clustering algorithm when different parameters are applied according to examples of the present disclosure.

FIGS. 7A-7D illustrate examples of applying a Gaussian kernel to remove false detections and a resulting bounding box according to examples of the present disclosure.

FIG. 13 illustrates an example of using heatmap base data to remove false positive detections according to examples of the present disclosure.

FIG. 14A-14C are flowcharts conceptually illustrating example methods for updating heatmap base data according to examples of the present disclosure.

FIGS. 15A-15B illustrate examples of updating heatmap base data using two different techniques according to examples of the present disclosure.

FIG. 16 is a flowchart conceptually illustrating an example method for detecting human presence or performing detection localization after removing false positive detections according to examples of the present disclosure.

DETAILED DESCRIPTION

Figure 2A:
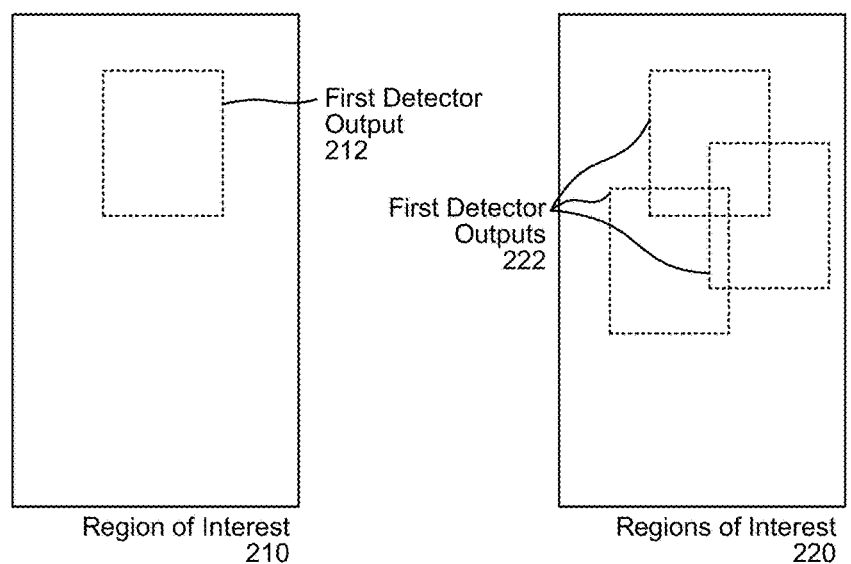
FIGS. 2A-2B illustrate examples of detecting regions of interest using one or more detectors.

Electronic devices may be used to capture and process image data. An electronic device may perform object detection (e.g., object detection, full face detection, half face detection, head and shoulders detection, etc.) and/or localization on the image data by generating one or more regions of interest. A region of interest may be associated with a confidence value indicating a likelihood that the object is represented in the region of interest. When two or more regions of interest overlap, current techniques determine a single region of interest associated with a highest confidence value and ignore the remaining overlapping regions of interest.

To improve human presence detection and/or localization, devices, systems and methods are disclosed that generate aggregate confidence scores and/or generate a heatmap corresponding to the aggregate confidence scores. The system may determine the aggregate confidence scores by aggregating confidence scores (e.g., confidence values) corresponding to overlapping regions of interest. For example, a first pixel included in a first region of interest and a second region of interest may be associated with an aggregate confidence value equal to a sum of a first confidence value associated with the first region of interest and a second confidence value associated with the second region of interest. The system may perform human presence detection by comparing the aggregate confidence scores to a universal threshold, with aggregate confidence scores above the universal threshold indicating that human presence is detected. The system may use the aggregate confidence scores to generate a heatmap and may perform human presence localization by identifying a strongest cluster of pixels in the heatmap and determining a bounding box surrounding the strongest cluster. To distinguish the strongest cluster from a second strongest cluster of pixels, the system may apply a Gaussian kernel with varying scale parameters. The system may store the scale parameter at which the strongest cluster separates from the second strongest cluster and may generate the bounding box.

FIG. 1 illustrates a high-level conceptual block diagram of a system 100 configured to perform human presence detection and/or localization. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 and server(s) 120 that may be communicatively coupled to network(s) 10.

The device 110 may be an electronic device configured to capture and/or receive image data. In some examples, the device 110 may include camera(s) 112, although the disclosure is not limited thereto and the device 110 may receive the image data from a remote device 110 and/or an image capture device 114 without departing from the disclosure.

A detector 102 may be configured to perform human presence detection and/or localization on image data. In some examples, the device 110 may include the detector 102 and may process image data using the detector 102 to perform presence detection and/or detection localization. For example, the device 110 may include camera(s) 112 and may generate image data using the camera(s) 112. Additionally or alternatively, the image capture device 114 or the remote device 110 may include camera(s) 112 and may generate image data using the camera(s) 112. Therefore, the device 110 may receive the image data from the remote device 110/image capture device 114 via the network(s) 10 without departing from the disclosure.

The disclosure is not limited thereto, however, and in other examples the server(s) 120 may include the detector 102 and may process the image data using the detector 102 to perform presence detection and/or detection localization. For example, the device 110 and/or the image capture device 114 may generate the image data using the camera(s) 112 and the server(s) 120 may receive the image data from the device 110/image capture device 114 via the network(s) 10 without departing from the disclosure. For ease of illustration, FIG. 1 illustrates the detector 102 being included in both the device 110 and the server(s) 120, although the disclosure is not limited thereto and the detector 102 may be included in only one of the device 110 or the server(s) 120.

In some examples, the detector 102 may perform human presence detection to determine if human presence is detected in image data 20. Additionally or alternatively, the detector 102 may perform detection localization on the image data 20 to generate a region of interest that may be represented by bounding box 104.

Using computer vision, an object detector may perform object detection on image data to identify one or more regions of interest associated with an object. The object detector may be trained to detect specific items, such as objects and/or humans (e.g., head and shoulder, half body, half face, full face, quarter face, etc.), and may analyze the image data and generate one or more regions of interest indicating an area of the image data corresponding to the specific item on which the object detector is trained. For example, a first object detector trained to detect a full face (e.g., face detector) may generate a first region of interest having a bounding box (e.g., minimum bounding box) surrounding a full face represented in the image data, whereas a second object detector trained to detect head and shoulders (e.g., head detector) may generate a second region of interest having a bounding box surrounding an upper portion of a torso (e.g., entire head and shoulders) that is represented in the image data. In addition to generating the first region of interest, the first object detector may generate a first confidence value indicating a level of confidence (e.g., likelihood) that a full face is represented in the first region of interest. Similarly, the second object detector may generate a second confidence value indicating a level of confidence that head and shoulders are represented in the second region of interest.

The region of interest may be associated with the selected item on which the object detector is trained (e.g., head and shoulders, full face, etc.), a candidate area of the image data (e.g., a plurality of pixels associated with the region of interest), which may be represented as a bounding box (e.g., minimum bounding box) indicating a perimeter of the candidate area, and/or a confidence value (e.g., confidence score) indicating a level of confidence (e.g., likelihood) that the specific item is represented in the candidate area. For example, the first region of interest may be associated with a small number of pixels (e.g., candidate area corresponding to a small rectangle surrounding a face in the image data) and a high confidence value (e.g., high likelihood that a full face is represented in the first region of interest). In contrast, the second region of interest may be associated with a large number of pixels (e.g., candidate area corresponding to a large rectangle in the image data) and a low confidence value (e.g., small likelihood that head and shoulders are represented in the second region of interest).

A single object detector may be trained to detect a single item and/or multiple items without departing from the disclosure. Additionally or alternatively, a single object detector may generate a single region of interest and/or multiple regions of interest without departing from the disclosure. In some examples, the system 100 may generate multiple regions of interest using a single object detector. Additionally or alternatively, the system 100 may use multiple detectors to generate one or more regions of interest without departing from the disclosure.

Figure 2B:
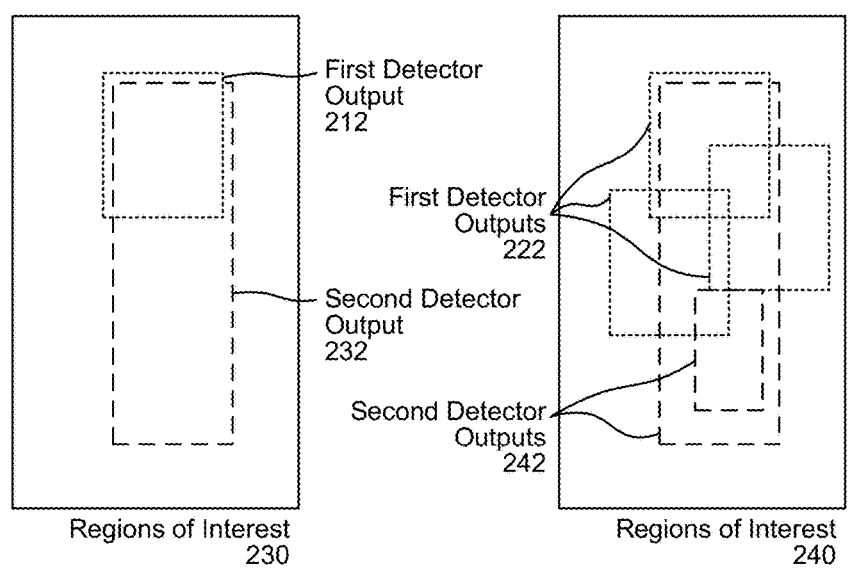

FIGS. 2A-2B illustrate examples of detecting regions of interest using one or more object detectors. As illustrated in FIG. 2A, in some examples a single object detector may perform object detection on image data to identify a single region of interest 210 (e.g., first detector output 212). However, the disclosure is not limited thereto and in other examples a single object detector may perform object detection on image data to identify multiple regions of interest 220 (e.g., first detector outputs 222) without departing from the disclosure.

As illustrated in FIG. 2B, the disclosure is not limited to a single object detector and in some examples two or more object detectors may perform object detection on image data to identify regions of interest 230 (e.g., first detector output 212 generated by the first object detector and second detector output 232 generated by a second object detector). Similarly, two or more object detectors may perform object detection on image data to identify multiple regions of interest 240 (e.g., first detector outputs 222 generated by the first object detector and second detector outputs 242 generated by the second object detector). As can be understood by one of skill in the art, the number of object detectors, the number of specific items to be detected and a number of regions of interest generated may vary without departing from the disclosure.

FIG. 3 illustrates an example of selecting a region of interest having a highest confidence value from overlapping regions of interest. As illustrated in FIG. 3, one or more object detectors may generate regions of interest 310 and corresponding confidence values, indicating a likelihood that the object being detected (e.g., human face) is at least partially represented in a particular area of the image data. For example, FIG. 3 illustrates a first region of interest 310a having an 80% confidence value, a second region of interest 310b having a 50% confidence value, and a third region of interest 310c having a 60% confidence value.

A common technique (e.g., conventional non-maximum suppression) is to compare overlapping regions of interest and select only the region of interest having a highest confidence value. For example, as illustrated in first comparison 320, the first region of interest 310a may be compared to the second region of interest 310b and the region of interest having a lower confidence value may be discarded. Thus, first results 322 illustrates that the second region of interest 310b is discarded (e.g., 50% is less than 80%), leaving only the first region of interest 310a and the third region of interest 310c. Similarly, second comparison 330 illustrates the first region of interest 310a being compared to the third region of interest 310c and second results 332 illustrates that the third region of interest 310c is discarded (e.g., 60% is less than 80%), leaving only the first region of interest 310a. Thus, a device may simplify the three regions of interest 310 down to the first region of interest 310a as the first region of interest 310a has a highest confidence value of the regions of interest 310.

For ease of illustration, the above description of the conventional non-maximum suppression technique is a simplification and the actual technique may be more complicated. In some examples, the technique may perform comparisons on a recursive basis, such as dividing a plurality of regions of interest 310 into groups of two and determining a single region of interest using a binary tree. For example, the technique may determine a single region of interest out of 64 regions of interest using six iterations, performing multiple comparisons in parallel for each iteration. Thus, the technique may perform 32 comparisons (e.g., compare 310a to 310b, 310c to 310d, etc.) in a first iteration, perform 16 comparisons (e.g., compare 310a to 310c, 310e to 310 g, etc.) in a second iteration, perform 8 comparisons (e.g., compare 310a to 310e, etc.) in a third iteration, perform 4 comparisons in a fourth iteration, perform 2 comparisons in a fifth iteration and then perform a single comparison to select the region of interest having a highest confidence value in a sixth iteration.

In addition, the conventional non-maximum suppression technique may only suppress non-maximum regions of interest if an overlap area of the regions of interest is above an overlap threshold. For example, if the overlap threshold is 20%, the technique will only compare the first region of interest 310a to the second region of interest 310b if an overlap region (e.g., pixels included in both the first region of interest 310a and the second region of interest 310b) is greater than 20% of an entire region. The entire region may correspond to an area of the first region of interest 310a, the second region of interest 310b or a combination of the first region of interest 310a and the second region of interest 310b. For example, if the first region of interest 310a is 10 pixels high by 5 pixels wide and the second region of interest 310b is 10 pixels high by 5 pixels wide, a total combined area may range from 50 square pixels (e.g., 100% overlap) to 100 square pixels (e.g., 0% overlap). In this simple example, the first region of interest 310a and the second region of interest 310b will only be compared if 17 or more pixels are included in the overlap region (e.g., 17 pixels included in both 310a/310b, 33 pixels included only in 310a and 33 pixels included only in 310b, resulting in 17 pixels in the overlap region compared to 83 pixels in the total combined area. 17/83=20.4%, which is above the overlap threshold value of 20%).

The example illustrated above is provided for illustrative purposes only and techniques may vary. In some examples, the technique will compare regions of interest if 20% or more of either region of interest is included in the overlap region. For example, if the first region of interest 310a is 10 pixels high by 5 pixels wide, the technique may compare the first region of interest 310a to the second region of interest 310b if 10 or more pixels are included in the overlap region, regardless of the dimensions of the second region of interest 310b. Additionally or alternatively, the overlap threshold value itself may vary.

While this technique effectively determines a region of interest having a highest confidence value, it doesn't take into account a number of regions of interest. For example, the technique results in a single region of interest having the highest confidence value (e.g., 80%) whether there are three overlapping regions of interest or ten overlapping regions of interest. Thus, the technique is limited to an accuracy of the object detector in determining the highest confidence value.

To improve object detection and detection localization, the system 100 may take into account overlapping regions of interest having confidence values below the highest confidence value. For example, while a highest confidence value may be below a presence threshold (e.g., highest confidence value does not indicate a high likelihood that a human is represented on its own), a number of overlapping regions of interest increase the likelihood that a human is represented in the image data. Instead of comparing regions of interest against each other to select a single region of interest, the system 100 may take into account each of the overlapping regions of interest and generate a combined confidence value indicating a likelihood that a human is represented.

In some examples, the detector 102 may determine an aggregate confidence value by summing confidence values for individual pixels. For example, a first pixel included in the first region of interest 310a and the second region of interest 310b has an aggregate confidence value of 130% (e.g., 80%+50%), a second pixel included in the first region of interest 310a and the third region of interest 310c has an aggregate confidence value of 140% (e.g., 80%+60%), a third pixel included in the second region of interest 310b and the third region of interest 310c has an aggregate confidence value of 110% (e.g., 50%+60%), and a fourth pixel included in the first region of interest 310a, the second region of interest 310b and the third region of interest 310c has an aggregate confidence value of 190% (e.g., 80%+60%+50%). As the aggregate confidence value increases for each additional region of interest, determining aggregate confidence values provides greater detail and/or separation between pixels associated with multiple regions of interest and pixels associated with only a few regions of interest.

As illustrated in FIG. 1, the detector 102 may receive (130) image data, may determine (132) region(s) of interest represented in the image data and may determine (134) confidence value(s) corresponding to the region(s) of interest. For example, the first detector may be a face detector configured to detect full faces and may generate one or more first regions of interest, with each of the one or more regions of interest associated with a confidence value indicating a likelihood that a full face is represented in the region of interest.

The detector 102 may determine (136) aggregate confidence values for individual pixels by summing confidence values associated with regions of interest that include an individual pixel. For example, a pixel included in a first region of interest associated with a first confidence value (e.g., 80%) and included in a second region of interest associated with a second confidence value (e.g., 60%) has an aggregate confidence value equal to a sum of the first confidence value and the second confidence value (e.g., 80%+60%=140%).

The detector 102 may generate (138) a heatmap (e.g., determine heatmap data) based on the aggregate confidence values. A heatmap (also referred to as a heatmap representation) is a representation (such as a graphical representation) of data, where individual values (e.g., aggregate confidence values) are represented as colors. As used herein, a heatmap may be referred to as a graphical representation without departing from the disclosure, although the heatmap may correspond to the graphical representation itself (e.g., image) and/or heatmap data (e.g., pixel intensity data corresponding to the image) used to generate the graphical representation. For example, a pixel in the heatmap may have a pixel value (e.g., pixel color value and/or pixel intensity value), which is determined based on the aggregate confidence value associated with the pixel, and the heatmap data may indicate the pixel values for each pixel in the heatmap.

In some examples, the pixel value may correspond to an intensity value (e.g., pixel intensity value) ranging across a spectrum from a minimum intensity value (e.g., 0, which corresponds to black) to a peak intensity value (e.g., maximum intensity value, which corresponds to white). For ease of explanation, the pixel values/heatmap data will be described using intensity values. However, the disclosure is not limited thereto and the pixel values/heatmap data may correspond to color values and/or intensity values without departing from the disclosure. For ease of illustration, the following examples illustrate the maximum intensity value having a value of 100000. However, the disclosure is not limited thereto and the maximum intensity value may vary without departing from the disclosure. For example, the maximum intensity value may depend on a pixel format (e.g., number of bits used to represent a pixel) used for the heatmap data, with an 8-bit pixel format having a maximum intensity value of 255, a 16-bit pixel format having maximum intensity value of 65536, and so on.

The detector 102 may determine a minimum aggregate confidence value and a maximum aggregate confidence value (e.g., peak aggregate confidence value) and may translate the aggregate confidence values to the intensity values. For example, a minimum intensity value may correspond to an aggregate confidence value of zero (e.g., pixel is not associated with any region of interest), a peak intensity value may correspond to the peak aggregate confidence value (e.g., highest aggregate confidence value associated with any pixel in the image data), and the remaining intensity values may vary based on corresponding aggregate confidence values.

To generate the intensity values, the detector 102 may translate the aggregate confidence values based on a global maximum aggregate confidence value, such that the intensity values are proportional to the aggregate confidence values. For example, the detector 102 may determine that the aggregate confidence values range from a minimum aggregate confidence value (e.g., 0%) to a maximum aggregate confidence value (e.g., 190%) and may translate the aggregate confidence values to intensity values ranging from a minimum intensity value (e.g., 0) to a maximum intensity value (e.g., 100000). Thus, the minimum aggregate confidence value (e.g., 0%) corresponds to the minimum intensity value (e.g., 0), the first confidence value (e.g., 80%) corresponds to an intensity value of roughly 42105, the second confidence value (e.g., 60%) corresponds to an intensity value of roughly 31579, the third confidence value (e.g., 50%) corresponds to an intensity value of roughly 26315, an aggregate confidence value of 130% corresponds to an intensity value of roughly 68421, an aggregate confidence value of 140% corresponds to an intensity value of roughly 73684, and the maximum confidence value (e.g., 190%) corresponds to the maximum intensity value (e.g., 100000).

The maximum intensity value is an absolute value that is fixed based on the pixel format used to generate the heatmap data. For example, if the maximum intensity value is set to 100000, the maximum intensity value is 100000 for heatmap data regardless of the aggregate confidence values. In contrast, the maximum aggregate confidence value may vary based on the number of regions of interest and corresponding confidence values. Thus, the maximum aggregate confidence value may be a first value (e.g., 190%) at a first time and may be a second value (e.g., 400%) at a second time. In some examples, the detector 102 may scale the intensity values consistently using a global maximum aggregate confidence value (e.g., highest aggregate confidence value over a period of time) to provide additional context for the heatmap data. For example, first image data captured at the first time may represent a person facing away from a camera, while second image data captured at the second time may represent the person facing the camera. Thus, while the first value (e.g., 190%) corresponds to the maximum aggregate confidence value at the first time, the first value isn't as strong an indication that a human is present as the second value (e.g., 400%). Therefore, the detector 102 may generate the heatmap data by scaling the first value using the second value to generate a pixel intensity value of 47500 instead of 100000.

The global maximum aggregate confidence value may be determined using various techniques and/or across various time periods. In some examples, the detector 102 may associate a global maximum aggregate confidence value with an environment, such that the global maximum aggregate confidence value corresponds to a highest aggregate confidence value for a particular field of view (e.g., scene represented in the image data) at any time. Thus, the detector 102 may use a first global maximum aggregate confidence value in a first location and a second global maximum aggregate confidence value in a second location. Additionally or alternatively, the detector 102 may store the global maximum aggregate confidence value for a specific period of time. Thus, the global maximum aggregate confidence value changes over time and indicates a highest aggregate confidence value in a recent time period (e.g., last 5 minutes, last hour, etc.).

The detector 102 may determine (140) a global maximum intensity value (e.g., highest intensity value) in the heatmap. For example, the detector 102 may identify which intensity value is a highest intensity value out of all of the intensity values included in the heatmap data. The detector 102 may then determine (142) whether human presence is detected by comparing the global maximum intensity value to a universal threshold (e.g., presence threshold). The universal threshold may be determined based on training data and may apply to all heatmaps, such that intensity values above the universal threshold indicate that a human is present and intensity values below the universal threshold indicate that a human is not present.

The detector 102 may identify (144) a location of a strongest cluster of pixels using a mean shift clustering algorithm. For example, the mean shift clustering algorithm attempts to aggregate a maximum amount of energy within a sliding window, repeatedly iterating and moving the sliding window towards areas of higher energy until it converges at a global maximum. The sliding window is centered on the global maximum and includes an approximation of the strongest cluster of pixels. To determine a precise boundary around the strongest cluster of pixels, the detector 102 may determine (146) a bounding box (e.g., output region of interest) corresponding to the strongest cluster of pixels and may output a localization result represented by the bounding box. For example, the detector 102 may perform a region growing algorithm (e.g., region-growth algorithm, region-based image segmentation or the like) to determine the bounding box, as discussed in greater detail below with regard to FIG. 11.

In some examples, the detector 102 may evaluate the aggregate confidence values determined in step 136 to determine the strongest cluster and may determine the bounding box based on a perimeter of the strongest cluster. Additionally or alternatively, the detector 102 may evaluate intensity values of the heatmap determined in step 138 to determine the strongest cluster and may determine the bounding box based on the perimeter of the strongest cluster. However, the disclosure is not limited thereto and the detector 102 may perform additional processing based on the threshold value prior to evaluating the clusters. For example, the detector 102 may modify the aggregate confidence values prior to performing cluster analysis and/or may remove some of the regions of interest (e.g., regions of interest associated with confidence values below a threshold or the like) prior to generating the aggregate confidence values without departing from the present disclosure.

FIG. 4 illustrates an example of aggregating confidence values from multiple regions of interest and generating a heatmap according to examples of the present disclosure. As illustrated in FIG. 4, one or more object detectors may generate regions of interest 410, which include a first region of interest 410a having an 80% confidence value, a second region of interest 410b having a 50% confidence value, and a third region of interest 410c having a 60% confidence value.

In some examples, the detector 102 may determine an aggregate confidence value by summing confidence values for individual pixels, as illustrated by aggregate confidence chart 420. The aggregate confidence values may range from a minimum aggregate confidence value (e.g., 0%, indicating that a pixel is not associated with any region of interest) to a peak aggregate confidence value (e.g., highest aggregate confidence value associated with any pixel in the image data, in this case 190%).

The aggregate confidence chart 420 illustrates that each pixel corresponds to an aggregate confidence value determined based on regions of interest 410 associated with the individual pixel. However, due to the number of pixels, the aggregate confidence chart 420 cannot represent actual aggregate confidence values for each pixel. Instead, a portion of the aggregate confidence chart 420 is enlarged where the regions of interest 410 overlap to illustrate examples of aggregate confidence values. For example, a first pixel included in the first region of interest 410a and the second region of interest 410b has a first aggregate confidence value of 130% (e.g., 80%+50%), a second pixel included in the first region of interest 410a and the third region of interest 410c has a second aggregate confidence value of 140% (e.g., 80%+60%), a third pixel included in the second region of interest 410b and the third region of interest 410c has a third aggregate confidence value of 110% (e.g., 50%+60%), and a fourth pixel included in the first region of interest 410a, the second region of interest 410b and the third region of interest 410c has a fourth aggregate confidence value of 190% (e.g., 80%+60%+50%). In addition, a pixel that is only included in a single region of interest 410 has an aggregate confidence value equal to the confidence value associated with the region of interest 410 (e.g., confidence values of 80%, 50%, 60%, respectively, for the first region of interest 410a, the second region of interest 410b and the third region of interest 410c), while a pixel that is not included in any regions of interest 410 has an aggregate confidence value equal to zero (e.g., 0%).

In some examples, the detector 102 may generate a heatmap (e.g., heatmap data) based on the aggregate confidence values, as discussed above with regard to FIG. 1. A heatmap is a representation of data, where the individual values (e.g., aggregate confidence values) are represented as colors. As used herein, a heatmap may be referred to as a graphical representation without departing from the disclosure, although the heatmap may correspond to the graphical representation itself (e.g., image) and/or heatmap data used to generate the graphical representation. For example, a pixel in the heatmap may have a pixel value (e.g., color value and/or intensity value), which is determined based on the aggregate confidence value associated with the pixel, and the heatmap data may indicate the pixel values for each pixel in the heatmap. For ease of illustration, the heatmaps illustrated in FIGS. 4-7D are monochromatic (e.g., black and white), such that the pixel value corresponds to an intensity value ranging across a spectrum from a minimum intensity value (e.g., 0, which corresponds to black) to a peak intensity value (e.g., maximum intensity value, which corresponds to white). The minimum intensity value corresponds to an aggregate confidence value of zero (e.g., pixel is not associated with any region of interest), the peak intensity value corresponds to a peak aggregate confidence value (e.g., highest aggregate confidence value associated with any pixel in the image data), and the remaining intensity values vary based on corresponding aggregate confidence values.

While the heatmaps illustrated in FIGS. 4-7D are monochromatic, the disclosure is not limited thereto. Instead, the pixel value may correspond to a color value or to a color value and an intensity value without departing from the disclosure.

To generate aggregate heatmap 430, the detector 102 may determine a minimum aggregate confidence value and a maximum aggregate confidence value (e.g., peak aggregate confidence value) and may translate the aggregate confidence values to the intensity values. As illustrated in FIG. 4, the aggregate heatmap 430 represents the aggregate confidence values on a spectrum from black to white, with black corresponding to a minimum aggregate confidence value (e.g., 0%) and white corresponding to a maximum aggregate confidence value (e.g., peak aggregate confidence value, in this case 190%). As illustrated in the aggregate heatmap 430, pixels not included in a region of interest 410 are represented as black and pixels included only in a single region of interest 410 are represented as varying shades of dark gray depending on the actual confidence value. Similarly, pixels included in two regions of interest 410 (e.g., the first pixel included in 410a/410b, the second pixel included in 410a/410c, and the third pixel included in 410b/410c) are represented as varying shades of light gray, depending on the aggregate confidence value, while pixels included in all three regions of interest 410 (e.g., the fourth pixel included in 410a/410b/410c) are represented as white. For ease of illustration, a portion of the aggregate heatmap 430 is enlarged where the regions of interest 410 overlap to illustrate examples of how the aggregate confidence values are represented in the aggregate heatmap 430.

To generate the intensity values, the detector 102 may translate the aggregate confidence values based on a global maximum aggregate confidence value, such that the intensity values are proportional to the aggregate confidence values. For example, the detector 102 may determine that the aggregate confidence values range from the minimum aggregate confidence value (e.g., 0%) to the maximum aggregate confidence value (e.g., 190%) and may translate the aggregate confidence values to intensity values ranging from a minimum intensity value (e.g., 0) to a maximum intensity value (e.g., 100000). Thus, the minimum aggregate confidence value (e.g., 0%) corresponds to the minimum intensity value (e.g., 0), the first confidence value (e.g., 80%) corresponds to an intensity value of roughly 42105, the second confidence value (e.g., 60%) corresponds to an intensity value of roughly 31579, the third confidence value (e.g., 50%) corresponds to an intensity value of roughly 26315, an aggregate confidence value of 130% corresponds to an intensity value of roughly 68421, an aggregate confidence value of 140% corresponds to an intensity value of roughly 73684, and the maximum confidence value (e.g., 190%) corresponds to the maximum intensity value (e.g., 100000).

For ease of illustration, the above example illustrates the maximum intensity value having a value of 100000. However, the disclosure is not limited thereto and the maximum intensity value may vary without departing from the disclosure. For example, the maximum intensity value may depend on a pixel format (e.g., number of bits used to represent a pixel) used for the heatmap data, with an 8-bit pixel format having a maximum intensity value of 255, a 16-bit pixel format having maximum intensity value of 65536, and so on.

For ease of illustration, the aggregate heatmap 430 illustrates the intensity values using colors ranging from black to white instead of numeric integers. However, each color corresponds to a specific numeric integer and the heatmap data used to generate the aggregate heatmap 430 stores the intensity values. For example, the minimum intensity value (e.g., 0) is represented as black, intensity values (e.g., 26315, 31579, and 42105) associated with a single region of interest are represented as varying shades of dark gray, intensity values (e.g., 57895, 68421, and 73684) associated with two regions of interest are represented as varying shades of light gray, and the maximum intensity value (e.g., 100000) associated with all three regions of interest is represented as white.

The maximum intensity value is an absolute value that is fixed based on the pixel format used to generate the heatmap data. For example, if the maximum intensity value is set to 100000, the maximum intensity value is 100000 for heatmap data regardless of the aggregate confidence values. In contrast, the maximum aggregate confidence value may vary based on the number of regions of interest and corresponding confidence values. Thus, the maximum aggregate confidence value may be a first value (e.g., 190%) at a first time and may be a second value (e.g., 400%) at a second time. In some examples, the detector 102 may scale the intensity values consistently using a global maximum aggregate confidence value (e.g., highest aggregate confidence value over a period of time) to provide additional context for the heatmap data. For example, first image data captured at the first time may represent a person facing away from a camera, while second image data captured at the second time may represent the person facing the camera. Thus, while the first value (e.g., 190%) corresponds to the maximum aggregate confidence value at the first time, the first value isn't as strong an indication that a human is present as the second value (e.g., 400%). Therefore, the detector 102 may generate the heatmap data by scaling the first value using the second value to generate a pixel intensity value of 47500 instead of 100000.

The global maximum aggregate confidence value may be determined using various techniques and/or across various time periods. In some examples, the detector 102 may associate a global maximum aggregate confidence value with an environment, such that the global maximum aggregate confidence value corresponds to a highest aggregate confidence value for a particular field of view (e.g., scene represented in the image data) at any time. Thus, the detector 102 may use a first global maximum aggregate confidence value in a first location and a second global maximum aggregate confidence value in a second location. Additionally or alternatively, the detector 102 may store the global maximum aggregate confidence value for a specific period of time. Thus, the global maximum aggregate confidence value changes over time and indicates a highest aggregate confidence value in a recent time period (e.g., last 5 minutes, last hour, etc.).

Based on the aggregate confidence chart 420 and/or the aggregate heatmap 430, the detector 102 may determine whether human presence is detected in the image data (e.g., perform presence detection). For example, the detector 102 may compare the aggregate confidence values to a universal confidence threshold value to determine if human presence is detected. The universal confidence threshold value may be based on a set of training data and may apply to any image data. Thus, aggregate confidence values above the universal confidence threshold value indicate that a human is present in the image data, whereas aggregate confidence values below the universal confidence threshold value indicate that a human is not present in the image data.

While the above examples illustrates the detector 102 comparing the aggregate confidence values to the universal confidence threshold value, the disclosure is not limited thereto and the detector 102 may compare the pixel intensity values to a universal intensity threshold value without departing from the disclosure. For example, the intensity values are generated by comparing aggregate confidence values relative to a global maximum aggregate confidence value (e.g., highest aggregate confidence value over a period of time). Thus, while a maximum aggregate confidence value may vary between environments (e.g., field of view and/or subjects represented in the image data) depending on a number of regions of interest and corresponding confidence values, the maximum intensity value is normalized and therefore does not vary. Therefore, the detector 102 may use the aggregate confidence chart 420 and/or the aggregate heatmap 430 to detect human presence without departing from the disclosure. Additionally, while the example illustrates detecting whether a human is present in the image data, the disclosure is not limited thereto and the concepts may be applied to detecting whether an object is present (e.g., object detection) in the image data without departing from the disclosure.

Additionally or alternatively, based on the aggregate confidence chart 420 and/or the aggregate heatmap 430, the detector 102 may perform detection localization to determine a specific location associated with the human/object that is detected. For example, in addition to or instead of determining that human presence is detected in the image data, the detector 102 may generate an output region of interest indicating a specific candidate area (e.g., plurality of pixels) in which the human is represented in the image data. The region of interest may be represented by a bounding box indicating a perimeter of the region of interest, although the disclosure is not limited thereto.

In order to determine the bounding box, the detector 102 may detect a peak aggregate confidence value in the aggregate confidence chart 420 and/or a peak intensity value in the aggregate heatmap 430 and may determine a "strong cluster" (e.g., strong cluster of pixels) that corresponds to the peak aggregate confidence value and/or the peak intensity value. For example, the detector 102 may determine that pixels included in the overlap region between the first region of interest 410a, the second region of interest 410b and the third region of interest 410c (e.g., peak pixels) are associated with the peak aggregate confidence value (e.g., 190%) and/or the peak intensity value (e.g., 100000, represented as white) and may determine a bounding box corresponding to the strong cluster that includes the peak pixels. In some examples, the detector 102 may generate the bounding box to only include the peak pixels, which in this example limits a size of the strong cluster to an area that is 7 pixels wide and 9 pixels high. However, the disclosure is not limited thereto and the detector 102 may generate the bounding box to include additional pixels without departing from the disclosure.

To illustrate an example, the detector 102 may detect the peak aggregate confidence value using the aggregate confidence chart 420 and may perform cluster analysis (e.g., using a clustering algorithm, such as a mean shift clustering algorithm, a quality threshold (QT) clustering algorithm or the like) on the confidence aggregate values to identify a cluster of pixels including the peak aggregate confidence value. Additionally or alternatively, the detector 102 may detect the peak intensity value using the aggregate heatmap 430 and may perform cluster analysis (e.g., using a clustering algorithm, such as a mean shift clustering algorithm, a quality threshold (QT) clustering algorithm or the like) on the intensity values to identify a cluster of pixels including the peak intensity value.

In some examples, the detector 102 may assume that a single human is present in the image data. Therefore, the detector 102 will generate a single region of interest corresponding to the strongest cluster of pixels (e.g., peak aggregate confidence value and/or peak intensity value). Thus, the peak aggregate confidence value and/or peak intensity value may correspond to a global maximum. However, the disclosure is not limited thereto and the detector 102 may generate multiple regions of interest without departing from the disclosure. As an example, the detector 102 may identify multiple local maxima (e.g., local peak aggregate confidence values and/or local peak intensity values) and may determine bounding boxes associated with corresponding clusters. For example, if two humans are present in the image data, the detector 102 may identify a first local maximum (e.g., peak aggregate confidence value and/or peak intensity value), determine a first cluster of pixels corresponding to the first local maximum, and generate a first region of interest corresponding to the first cluster of pixels. Similarly, the detector 102 may identify a second local maximum (e.g., a second highest aggregate confidence value and/or a second highest intensity value separate from the first cluster), determine a second cluster of pixels corresponding to the second local maximum, and generate a second region of interest corresponding to the second cluster of pixels. Thus, the first region of interest corresponds to the first human and the second region of interest corresponds to the second human.

In some examples, the output region of interest determined by the detector 102 may include a mixture of multiple detection clusters that negatively impact an accuracy of the detector 102. For example, when a single human is present in the image data, the output region of interest (e.g., detection localization) should correspond to only the strong cluster of pixels. In some cases, however, the output region of interest may correspond to two or more detection clusters, which increases a size of the output region of interest and therefore decreases an accuracy of the detector 102. For example, the output region of interest may include the first cluster (e.g., strong cluster) corresponding to the global maximum (e.g., peak aggregate confidence value and/or peak intensity value), which is a true detection (e.g., true positive), along with a second cluster (e.g., weak cluster) corresponding to a local maximum that is below the global maximum, which is a false detection (e.g., false positive).

FIG. 5A-5D illustrate examples of true detections being disturbed by false detections and a resulting bounding box according to examples of the present disclosure. As illustrated in FIG. 5A, a heatmap 510 represents a weak true detection and a corresponding bounding box 512. As a true detection cluster (e.g., strong cluster) represented in the heatmap 510 is relatively weak (e.g., peak intensity value is relatively close to intensity values of surrounding pixels), the strong cluster may be mixed with a false detection cluster (e.g., weak cluster) and the bounding box 512 may be larger than necessary.

As illustrated in FIG. 5B, a heatmap 520 represents a strong true detection cluster (e.g., strong cluster) mixed with a strong false detection cluster (e.g., weak cluster), along with a corresponding bounding box 522. The weak cluster pulls the region of interest away from the strong cluster, resulting in the bounding box 522 being larger than the true detection cluster.

As illustrated in FIG. 5C, a heatmap 530 represents a strong true detection cluster (e.g., strong cluster) separate from a strong false detection cluster (e.g., weak cluster), along with a corresponding bounding box 532. The weak cluster pulls the region of interest away from the strong cluster, resulting in the bounding box 532 being larger than the true detection cluster.

As illustrated in FIG. 5D, a heatmap 540 represents a strong true detection cluster (e.g., strong cluster) in proximity to a strong false detection cluster (e.g., weak cluster), along with a corresponding bounding box 542. The weak cluster pulls the region of interest away from the strong cluster, resulting in the bounding box 542 being larger than the true detection cluster.

To improve detection localization, the detector 102 may perform additional steps to identify the true detection cluster and generate the region of interest based only on the true detection cluster. For example, the detector 102 may identify the local maxima and run a watershed transformation on each of the local maxima, with clusters separated by the saddles. The watershed transformation treats the image data (e.g., intensity values of the heatmap) like a topographic map, with the brightness of each point representing its height, and finds the lines that run along the tops of ridges.

Additionally or alternatively, the detector 102 may apply a Gaussian kernel to separate the strong cluster from the weak cluster. In some examples, when raw confidence values are aggregated a resulting heatmap will have extensive overlap regions and a large number of pixels will be associated with a maximum confidence value. As a result, the detector 102 may be unable to identify an exact location as the global maximum. To increase an amount of detail in the aggregated heatmap, the detector 102 may optionally apply a Gaussian kernel (e.g., Gaussian filter) to individual regions of interest prior to generating the aggregate heatmap. This modifies the resulting confidence values so that the region of interest includes a spectrum of confidence values ranging from a maximum confidence value (e.g., innermost point of the region of interest) to a minimum confidence value (e.g., edges of the region of interest). By applying the Gaussian kernel to the region of interest, a center of the region of interest is emphasized relative to edges of the region of interest. Thus, when the detector 102 generates the aggregate heatmap, confidence values within the overlap regions vary based on where the regions of interest are centered, providing additional detail for the detector 102 to determine a global maximum within the aggregate heatmap.

An example of a Gaussian function is given by the following equation:

$$G_{2D}(x, y; \sigma) = \frac{1}{2\pi\sigma^2} e^{-\frac{x^2+y^2}{2\sigma^2}} \quad (1)$$

where x and y are the pixel coordinates in the heatmap (e.g., spatial parameters) and σ is a scale parameter (hereinafter referred to as $\sigma_s$). The scale parameter $\sigma_s$ determines the width of the Gaussian kernel. In statistics, when we consider the Gaussian probability density function the scale parameter $\sigma_s$ is called the standard deviation, and the square of the standard deviation (e.g., $\sigma_s^2$) is called the variance.

In some examples, the detector may run the Gaussian kernel on top of each region of interest prior to determining the aggregate confidence chart and/or the heatmap. For example, the detector 102 may generate a confidence chart for each region of interest, with pixels associated with the region of interest having a confidence value associated with the region of interest and pixels not associated with the region of interest having a confidence value of zero, and may apply the Gaussian kernel to the confidence chart prior to determining the aggregate confidence chart. Similarly, the detector 102 may generate a heatmap for each region of interest based on the confidence value and a global maximum aggregate confidence value, with pixels associated with the region of interest having an intensity value proportional to the confidence value of the region of interest and pixels not associated with the region of interest having an intensity value of zero, and may apply the Gaussian kernel to the heatmap prior to determining an aggregate heatmap.

In some examples, the scale parameter $\sigma_s$ of the Gaussian kernel varies between regions of interest based on a fixed ratio. Thus, the scale parameter $\sigma_s$ may be determined based on a size of the region of interest, such as one quarter of the length or width. For example, a first region of interest may be 100 pixels wide by 100 pixels tall while a second region of interest may be 200 pixels wide by 200 pixels tall. A first scale parameter $\sigma_{s1}$ used for the first region of interest would be 25 pixels (e.g., 100 pixels divided by four), whereas a second scale parameter $\sigma_{s2}$ used for the second region of interest would be 50 pixels (e.g., 50 pixels divided by four). While the above examples illustrate the fixed ratio being ¼, the disclosure is not limited thereto and the fixed ratio may vary. However, the disclosure is not limited thereto and the scale parameter $\sigma_s$ may not be a fixed ratio and instead may vary based on the region of interest without departing from the disclosure. For example, the first scale parameter $\sigma_{s1}$ and the second scale parameter $\sigma_{s2}$ may be 25 pixels without departing from the disclosure.

In some examples, the scale parameter σ, and/or the fixed ratio used to calculate the scale parameter σ, may be adaptively determined based on the aggregate heatmap. For example, a first aggregate heatmap may have few overlapping regions of interest whereas a second aggregate heatmap may have a plurality of overlapping regions of interest. As the first aggregate heatmap has only a few overlapping regions of interest, a first fixed ratio used for all regions of interest to generate the first aggregate heatmap may be relatively large (e.g., ¼) as there is a clear global maximum in the overlapping regions. In contrast, as the second aggregate heatmap has a plurality of overlapping regions of interest, a second fixed ratio used for all regions of interest to generate the second aggregate heatmap may be relatively small (e.g., 1/10) to reduce a size of each region of interest and provide additional detail to the second aggregate heatmap.

Thus, the Gaussian kernel may separate the true detection cluster (e.g., strong cluster) from the false detection cluster (e.g., weak cluster), with a higher scale parameter σ, (e.g., stronger filter) resulting in a bigger difference between the true detection cluster and the false detection cluster. In some examples, the detector 102 may start with a low scale parameter σ, (e.g., high fixed ratio) and may increase the scale parameter σ, (e.g., decrease the fixed ratio) until the strong cluster is separated from the weak cluster. When the strong cluster is separated from the weak cluster, the detector 102 may store the scale parameter $\sigma_s$/fixed ratio and use the scale parameter $\sigma_s$/fixed ratio to generate the aggregate heatmap. The detector 102 may then use the aggregate heatmap to perform cluster analysis (e.g., using a clustering algorithm, such as a mean shift clustering algorithm, a quality threshold (QT) clustering algorithm or the like).

When applying the Gaussian kernel to generate the heatmap (e.g., Gaussian filtering), increasing the scale parameter σ, increases the amount of blur applied, resulting in fewer pixels in a center of the region of interest having a maximum confidence value (e.g., confidence value associated with the region of interest prior to filtering). Thus, the region of interest changes from being rectangular, with a sharp transition from the maximum confidence value (e.g., along an edge of the region of interest) to a minimum confidence value (e.g., 0%, outside of the region of interest), to being circular, with a smooth transition throughout the region of interest from the maximum confidence value in the center of the region of interest to the minimum confidence value outside the region of interest.

After applying the Gaussian kernel and generating the heatmap, the detector 102 may perform cluster analysis (e.g., using a clustering algorithm, such as a mean shift clustering algorithm, a quality threshold (QT) clustering algorithm or the like). Based on the cluster analysis, the detector 102 may identify pixels associated with the strong cluster and may generate a region of interest (e.g., detection localization, or bounding box) corresponding to these pixels.

In some examples, the detector 102 may apply a mean shift clustering algorithm that also uses a Gaussian kernel. While similar to the Gaussian kernel described above (e.g., Gaussian filtering), the mean shift clustering algorithm uses different values for the standard deviation σ and the standard deviation σ has a different effect. In context of the mean shift clustering algorithm, the standard deviation σ used in the Gaussian kernel may be referred to as a bandwidth parameter $\sigma_b$ and corresponds to a window size. For example, the bandwidth parameter $\sigma_b$ should be selected so that nearly all pixels within a cluster fall within three times the bandwidth parameter $\sigma_b$ (e.g., $3\sigma_b$) from a center of the cluster. Thus, a larger bandwidth parameter $\sigma_b$ corresponds to a larger window size (e.g., more pixels included in a larger region of interest) and a smaller bandwidth parameter $\sigma_b$ corresponds to a smaller window size (e.g., fewer pixels included in a smaller region of interest). Thus, decreasing the bandwidth parameter $\sigma_b$ results in a smaller region of interest that more precisely indicates a location of the global maximum in the heatmap.

In some examples, the scale parameter σ, and the bandwidth parameter $\sigma_b$ may be related. For example, the detector 102 may determine the scale parameter σ, at which the strong cluster separates from the weak cluster and may store a value of the scale parameter σ, as the bandwidth parameter $\sigma_b$ and/or determine the bandwidth parameter $\sigma_b$ from the scale parameter $\sigma_s$ (e.g., as a fraction of the scale parameter $\sigma_s$, such as $\sigma_b=\sigma_s/3$). In this example, the scale parameter $\sigma_s$ may be used to determine the bandwidth parameter $\sigma_b$ because the width of the Gaussian kernel used to blur the regions of interest may correspond to a width of the cluster (e.g., window size). Thus, by determining at which scale parameter $\sigma$, the strong cluster separates from the weak cluster, the detector 102 may approximate the bandwidth parameter $\sigma_b$. However, the disclosure is not limited thereto and the scale parameter $\sigma$, and the bandwidth parameter $\sigma_b$ may vary without departing from the disclosure.

FIG. 6 illustrates examples of finding a global maximum using a mean shift clustering algorithm when different parameters are applied according to examples of the present disclosure. As discussed above, the mean shift clustering algorithm may apply different bandwidth parameters $\sigma_b$ to decrease a window size. As illustrated in FIG. 6, heatmap 610 corresponds to a first bandwidth parameter $\sigma_m$ (e.g., half of the region of interest divided by two), heatmap 620 corresponds to a second bandwidth parameter $\sigma_{b2}$ (e.g., half of the region of interest divided by three), heatmap 620 corresponds to a third bandwidth parameter $\sigma_{b3}$ (e.g., half of the region of interest divided by five), and heatmap 620 corresponds to a fourth bandwidth parameter $\sigma_{b4}$ (e.g., half of the region of interest divided by ten). As illustrated in FIG. 6, the size of the strong cluster decreases as the bandwidth parameter $\sigma_b$ decreases, with the strong cluster finally separating from the weak cluster at the fourth bandwidth parameter $\sigma_{b4}$.

FIGS. 7A-7D illustrate examples of applying a Gaussian kernel to remove false detections and a resulting bounding box according to examples of the present disclosure. As illustrated in FIG. 7A, the heatmap 510 represents a weak true detection and corresponds to the bounding box 512. As a true detection cluster (e.g., strong cluster) represented in the heatmap 510 is relatively weak (e.g., peak intensity value is relatively close to intensity values of surrounding pixels), the strong cluster may be mixed with a false detection cluster (e.g., weak cluster) and the bounding box 512 may be larger than necessary. In contrast, heatmap 710 represents the true detection cluster after applying the Gaussian kernel and a corresponding bounding box 712 is noticeably smaller than the bounding box 512. Thus, an accuracy of the detection localization is increased as the bounding box 712 corresponds only to the strong cluster and not to the weak cluster.

As illustrated in FIG. 7B, the heatmap 520 represents a strong true detection cluster (e.g., strong cluster) mixed with a strong false detection cluster (e.g., weak cluster) and corresponds to the corresponding bounding box 522. The weak cluster pulls the region of interest away from the strong cluster, resulting in the bounding box 522 being larger than the true detection cluster. In contrast, heatmap 720 represents the true detection cluster after applying the Gaussian kernel and a corresponding bounding box 722 is noticeably smaller than the bounding box 522. Thus, an accuracy of the detection localization is increased as the bounding box 722 corresponds only to the strong cluster and not to the weak cluster.

As illustrated in FIG. 7C, the heatmap 530 represents a strong true detection cluster (e.g., strong cluster) separate from a strong false detection cluster (e.g., weak cluster) and corresponds to the bounding box 532. The weak cluster pulls the region of interest away from the strong cluster, resulting in the bounding box 532 being larger than the true detection cluster. In contrast, heatmap 730 represents the true detection cluster after applying the Gaussian kernel and a corresponding bounding box 732 is noticeably smaller than the bounding box 532. Thus, an accuracy of the detection localization is increased as the bounding box 732 corresponds only to the strong cluster and not to the weak cluster.

As illustrated in FIG. 7D, the heatmap 540 represents a strong true detection cluster (e.g., strong cluster) in proximity to a strong false detection cluster (e.g., weak cluster) and corresponds to the bounding box 542. The weak cluster pulls the region of interest away from the strong cluster, resulting in the bounding box 542 being larger than the true detection cluster. In contrast, heatmap 740 represents the true detection cluster after applying the Gaussian kernel and a corresponding bounding box 742 is noticeably smaller than the bounding box 542. Thus, an accuracy of the detection localization is increased as the bounding box 742 corresponds only to the strong cluster and not to the weak cluster.

While FIGS. 6-7D illustrate the detector 102 applying a Gaussian kernel, the disclosure is not limited thereto. Instead, the detector 102 may apply other techniques known to one of skill in the art to separate the clusters, such as a Delta-Dirac function or the like.

Figure 8:
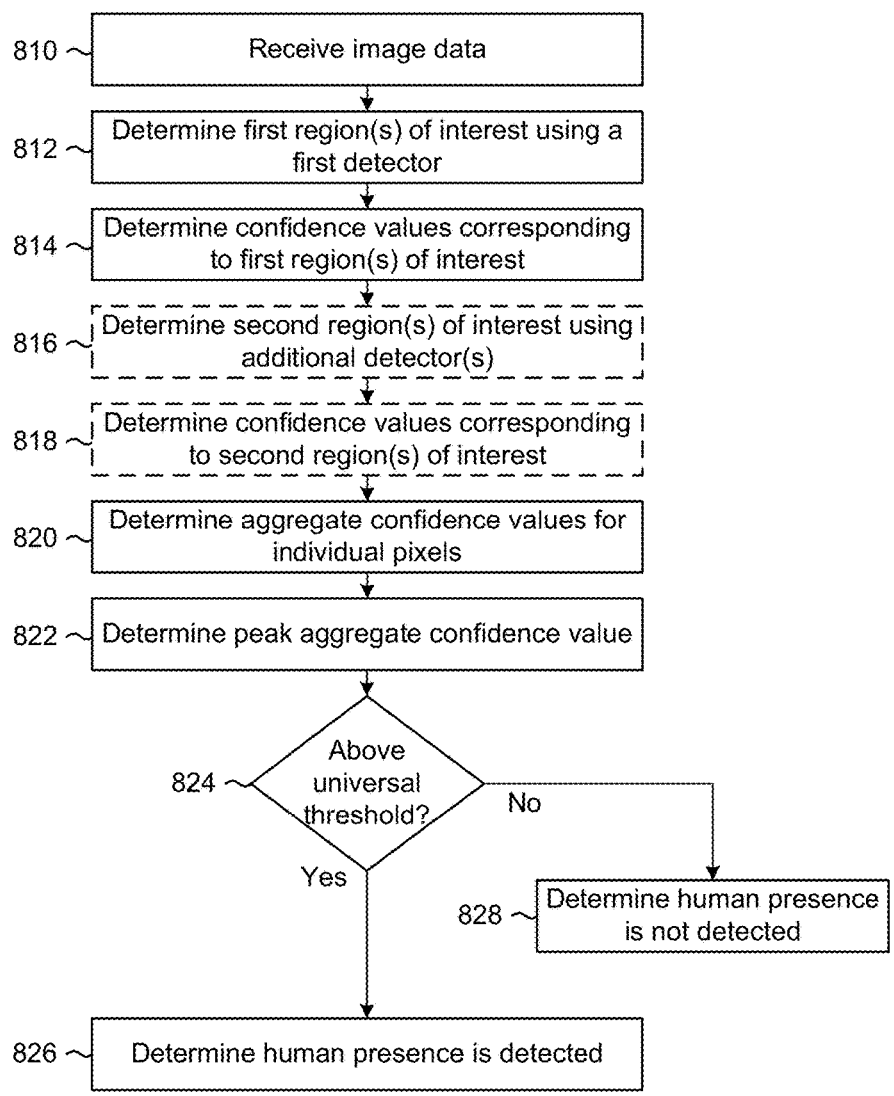
FIG. 8 is a flowchart conceptually illustrating an example method for detecting human presence based on a heatmap according to examples of the present disclosure.

FIG. 8 is a flowchart conceptually illustrating an example method for detecting human presence based on a heatmap according to examples of the present disclosure. As illustrated in FIG. 8, the detector 102 may receive (810) image data, may determine (812) first region(s) of interest using a first detector and may determine (814) confidence values corresponding to the first region(s) of interest. For example, the first detector may be a face detector configured to detect full faces and may generate one or more first regions of interest, with each of the one or more first regions of interest associated with a confidence value indicating a likelihood that a full face is represented in the region of interest.

Optionally, the detector 102 may determine (816) second region(s) of interest using additional detector(s) and may determine (818) confidence values corresponding to the second region(s) of interest. The additional detectors may include one or more detectors, such as a head and shoulder detector, an object detector, a half face detector or the like. For example, a second detector may be a head and shoulder detector configured to detect head and shoulders and may generate one or more second regions of interest, with each of the one or more second regions of interest associated with a confidence value indicating a likelihood that head and shoulders are represented in the region of interest. Steps 816 and 818 are illustrated using dashed lines to indicate that these steps are optional and the detector 102 may only use the first detector without departing from the disclosure.

After determining the first region(s) of interest and/or the second region(s) of interest, the detector 102 may determine (820) aggregate confidence values for individual pixels by summing confidence values associated with regions of interest that include an individual pixel. For example, a pixel included in a first region of interest associated with a first confidence value (e.g., 80%) and included in a second region of interest associated with a second confidence value (e.g., 60%) will have an aggregate confidence value equal to a sum of the first confidence value and the second confidence value (e.g., 80%+60%=140%).

To perform human presence detection and determine if a human is present in the image data, the detector 102 may determine (822) a peak aggregate confidence value (e.g., a highest aggregate confidence value associated with any pixel in the image data) and determine (824) if the peak aggregate confidence value is above a universal threshold value. The universal threshold value may be determined based on a large set of training data and may be applied to any image data to perform human presence detection. If the peak aggregate confidence value is above the universal threshold value, the detector 102 may determine (826) that human presence is detected in the image data, whereas if the peak aggregate confidence value is below the universal threshold value, the detector 102 may determine (828) that human presence is not detected in the image data.

While FIG. 8 illustrates the detector 102 comparing the peak aggregate confidence value to the universal confidence threshold value, the disclosure is not limited thereto and the detector 102 may compare pixel intensity values to a universal intensity threshold value without departing from the disclosure. For example, the detector 102 may generate intensity values by comparing aggregate confidence values to a global maximum aggregate confidence value (e.g., highest aggregate confidence value over a period of time). Thus, while a maximum aggregate confidence value may vary between environments (e.g., field of view and/or subjects represented in the image data) depending on a number of regions of interest and corresponding confidence values, the maximum intensity value is normalized and therefore does not vary.

In addition, while the examples illustrate detecting whether a human is present in the image data, the disclosure is not limited thereto and the concepts may be applied to detecting whether an object is present (e.g., object detection) in the image data without departing from the disclosure.

Figure 9:
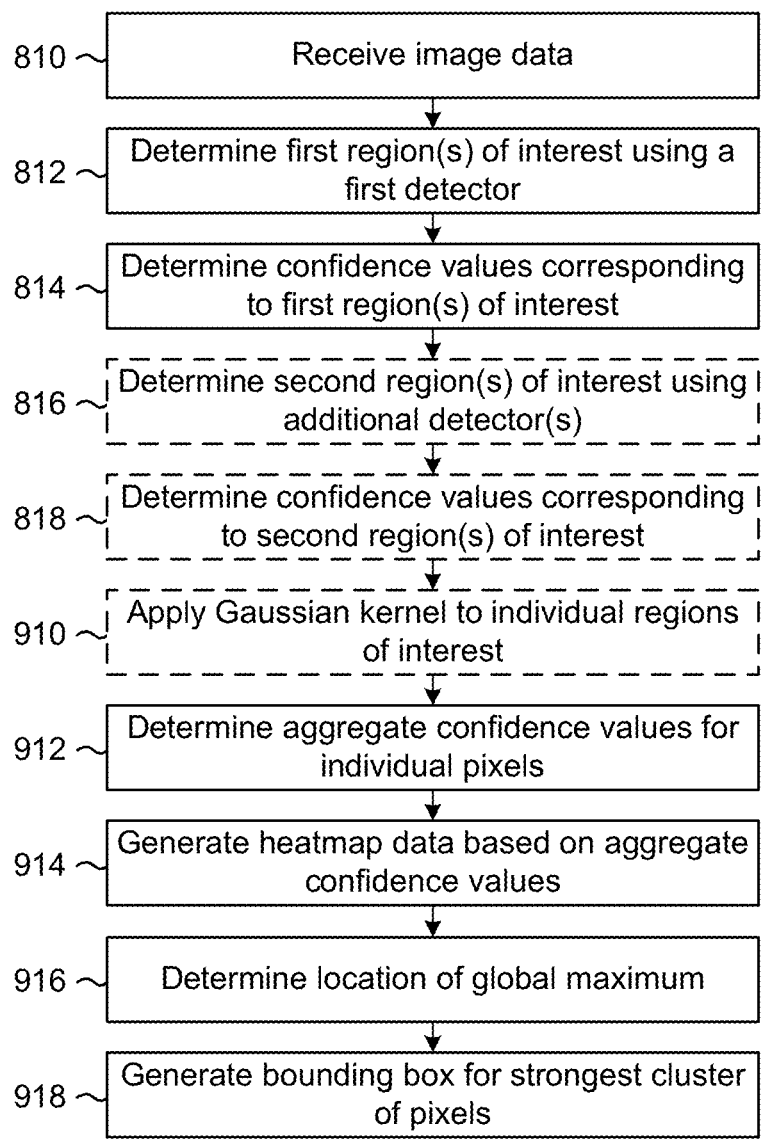
FIG. 9 is a flowchart conceptually illustrating an example method for performing detection localization according to examples of the present disclosure.

FIG. 9 is a flowchart conceptually illustrating an example method for performing detection localization according to examples of the present disclosure. As illustrated in FIG. 9, the detector 102 may receive (810) image data, may determine (812) first region(s) of interest using a first detector and may determine (814) confidence values corresponding to the first region(s) of interest. For example, the first detector may be a face detector configured to detect full faces and may generate one or more first regions of interest, with each of the one or more first regions of interest associated with a confidence value indicating a likelihood that a full face is represented in the region of interest.

Optionally, the detector 102 may determine (816) second region(s) of interest using additional detector(s) and may determine (818) confidence values corresponding to the second region(s) of interest. The additional detectors may include one or more detectors, such as a head and shoulder detector, an object detector, a half face detector or the like. For example, a second detector may be a head and shoulder detector configured to detect head and shoulders and may generate one or more second regions of interest, with each of the one or more second regions of interest associated with an individual confidence value indicating a likelihood that head and shoulders are represented in the region of interest. Steps 816 and 818 are illustrated using dashed lines to indicate that these steps are optional and the detector 102 may only use the first detector without departing from the disclosure.

After determining the first region(s) of interest and/or the second region(s) of interest, the detector 102 may optionally apply (910) a Gaussian kernel to individual regions of interest. For example, the detector 102 may generate an individual confidence chart for a first region of interest with pixels associated with the first region of interest having a first confidence value (e.g., 80%) and pixels not associated with the first region of interest having a second confidence value (e.g., 0%). The detector 102 may apply the Gaussian kernel to the confidence chart, as discussed in greater detail above, to "blur" the region of interest. Thus, a modified confidence chart after applying the Gaussian kernel may have a small group of pixels in a center of the region of interest having the first confidence value (e.g., 80%), with confidence values of neighboring pixels decreasing based on a distance from the center of the region of interest until confidence values reach the second confidence value (e.g., 0%). The detector 102 may individually apply Gaussian kernels to each of the regions of interest. In some examples, the detector may determine a scale parameter $\sigma_s$ for each Gaussian kernel based on a size of the region of interest (e.g., $\sigma_s$=¼ width of region of interest), although the disclosure is not limited thereto.

The detector 102 may determine (912) aggregate confidence values for individual pixels by summing confidence values associated with regions of interest that include an individual pixel. For example, a pixel included in a first region of interest associated with a first confidence value (e.g., 80%) and included in a second region of interest associated with a second confidence value (e.g., 60%) will have an aggregate confidence value equal to a sum of the first confidence value and the second confidence value (e.g., 80%+60%=140%). If the detector 102 applies the Gaussian kernels to the regions of interest in step 910, the aggregate confidence values may vary within each region of interest.

The detector 102 may generate (914) a heatmap (e.g., determine heatmap data) based on the aggregate confidence values. A heatmap is a graphical representation of data, where individual values (e.g., aggregate confidence values) are represented as colors. As used herein, a heatmap may be referred to as a graphical representation without departing from the disclosure, although the heatmap may correspond to the graphical representation itself (e.g., image) and/or heatmap data used to generate the graphical representation. For example, a pixel in the heatmap may have a pixel value (e.g., color value and/or intensity value), which is determined based on the aggregate confidence value associated with the pixel, and the heatmap data may indicate the pixel values for each pixel in the heatmap. For ease of illustration, the heatmaps illustrated in FIGS. 4-7D are monochromatic (e.g., black and white), such that the pixel value corresponds to an intensity value ranging across a spectrum from a minimum intensity value (e.g., 0, represented as black) to a peak intensity value (e.g., 100000, represented as white). However, the disclosure is not limited thereto and the pixel value may correspond to a color value without departing from the disclosure.

The detector 102 may determine a minimum aggregate confidence value and a maximum aggregate confidence value (e.g., peak aggregate confidence value) and may translate the aggregate confidence values to pixel intensity values, as discussed in greater detail above with regard to FIG. 4. For example, a minimum intensity value may correspond to an aggregate confidence value of zero (e.g., pixel is not associated with any region of interest), a peak intensity value may correspond to the peak aggregate confidence value (e.g., highest aggregate confidence value associated with any pixel in the image data), and the remaining intensity values may vary based on corresponding aggregate confidence values.

The detector 102 may determine (916) a location of a global maximum, such as by applying a mean shift clustering algorithm. For example, the mean shift clustering algorithm attempts to aggregate a maximum amount of energy within a sliding window, repeatedly iterating and moving the sliding window towards areas of higher energy until it converges at a global maximum. The sliding window is centered on the global maximum and includes an approximation of the strongest cluster of pixels.

To determine a precise boundary around the strongest cluster of pixels, the detector 102 may generate (918) a bounding box (e.g., output region of interest) corresponding to the strongest cluster of pixels and may output a localization result represented by the bounding box. For example, the detector 102 may perform a region growing algorithm (e.g., region-growth algorithm, region-based image segmentation or the like) to determine the bounding box, as discussed in greater detail below with regard to FIG. 11.

Figure 10:
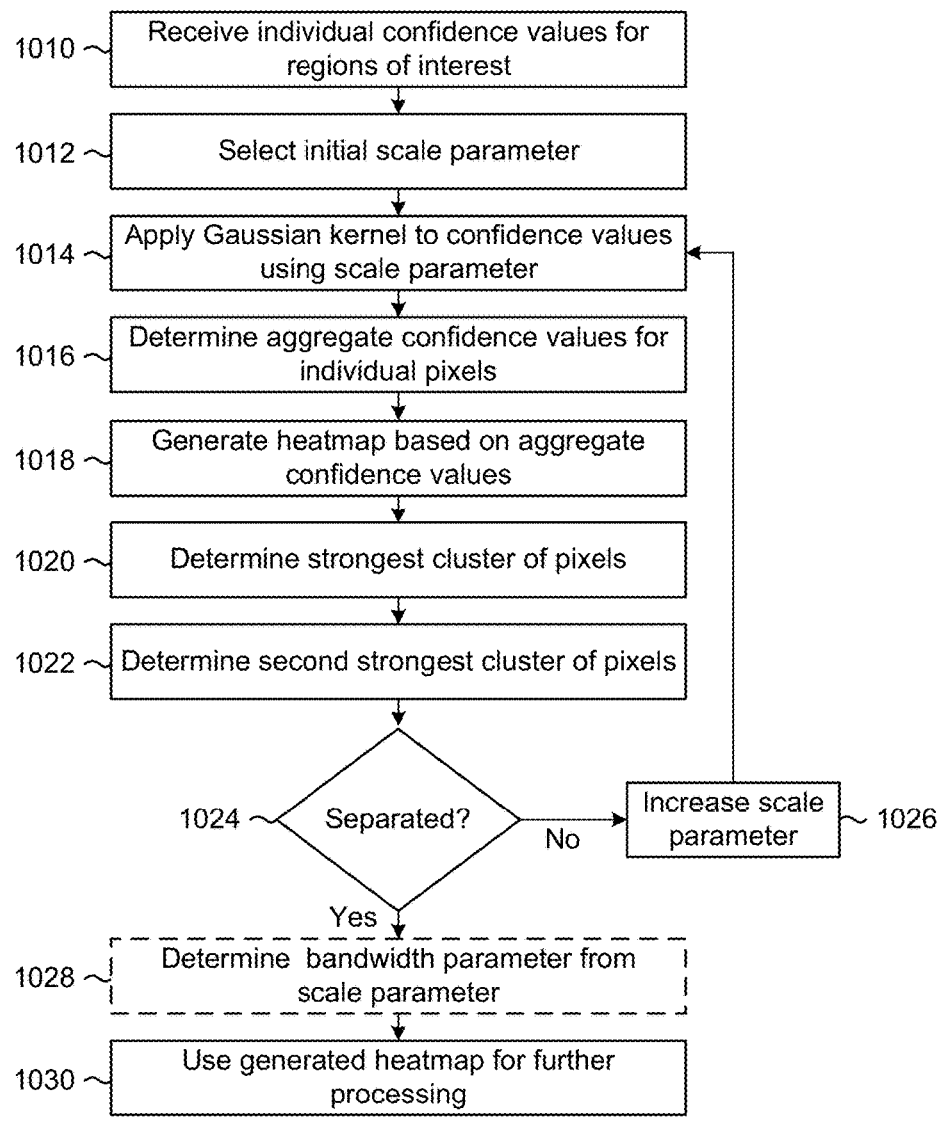
FIG. 10 is a flowchart conceptually illustrating an example method for determining a scale parameter to improve detection localization according to examples of the present disclosure.

FIG. 10 is a flowchart conceptually illustrating an example method for determining a scale parameter to improve detection localization according to examples of the present disclosure. As illustrated in FIG. 10, the detector 102 may receive (1010) individual confidence values and corresponding regions of interest determined in steps 812-818. For example, a first region of interest may indicate a 100 pixel by 100 pixel region of interest having a first confidence value (e.g., 80%) and a second region of interest may indicate a 200 pixel by 200 pixel region of interest having a second confidence value (e.g., 60%).

The detector 102 may select (1012) an initial scale parameter for a Gaussian kernel. The initial scale parameter may be a particular value (e.g., 20 pixels) or may be a ratio (e.g., ¼ of a width of the region of interest). If the initial scale parameter is a particular value, the detector 102 may use the same value (e.g., 20 pixels) for each region of interest. If the initial scale parameter is a ratio, the detector 102 may calculate a value of the initial scale parameter for each region of interest using the ratio. For example, a first scale parameter for the first region of interest would be equal to 25 pixels whereas a second scale parameter for the second region of interest would be equal to 50 pixels.

The detector 102 may apply (1014) the Gaussian kernel to confidence values using a current scale parameter. For example, the detector 102 will generate a first confidence chart for the first region of interest, with pixels included in the first region of interest having the first confidence value and remaining pixels having a confidence value of zero. The detector 102 may apply the Gaussian kernel to the first confidence chart to generate a second confidence chart, modifying each confidence value based on neighboring confidence values and the scale parameter (e.g., width) of the Gaussian kernel. Thus, confidence values for pixels outside of the first region of interest but within a fixed distance from an edge of the first region of interest may increase, while confidence values for pixels inside the first region of interest but within the fixed distance from the edge of the first region of interest may decrease. As a result of applying the Gaussian kernel, the confidence values in the second confidence chart are distributed with a portion of the first region of interest having the first confidence value (e.g., 80%) and remaining pixels varying between the first confidence value and zero. The detector 102 may repeat this process for each region of interest individually to generate a plurality of modified confidence charts.

In the first iteration of step 1014, the current scale parameter is the initial scale parameter, which is relatively low and results in minor blurring of the confidence values. For example, a small value for the scale parameter results in a large portion of the first region of interest having the first confidence value (e.g., 80%) with only pixels near an edge of the first region of interest having a lower confidence value. However, as the scale parameter is increased, the amount of blurring increases (e.g., Gaussian kernel has a larger width, reaching more pixels within the first region of interest) and a smaller portion of the first region of interest has the first confidence value while more pixels have a lower confidence value (e.g., ranging from 80% to 0% based on a distance from an edge of the first region of interest). If the scale parameter increases large enough, a width of the Gaussian kernel exceeds a size of the region of interest and all pixels have a confidence value lower than the first confidence value.

After applying the Gaussian kernels to each of the regions of interest to generate the plurality of modified confidence charts, the detector 102 may determine (1016) aggregate confidence values for individual pixels by summing confidence values for an individual pixel from each of the plurality of modified confidence charts. For example, a pixel included in the first region of interest associated with the first confidence value (e.g., 80%) and included in the second region of interest associated with the second confidence value (e.g., 60%) will have an aggregate confidence value equal to a sum of the first confidence value and the second confidence value (e.g., 80%+60%=140%). As the aggregate confidence values are determined based on the plurality of modified confidence charts, the aggregate values may vary within each region of interest, unlike the examples illustrated in FIG. 4.

The detector 102 may generate (1018) a heatmap (e.g., determine heatmap data) based on the aggregate confidence values, as discussed in greater detail above with regard to step 914. For example, an aggregate confidence value may be translated to an intensity value that is proportional to the aggregate confidence value. As an example, an aggregate confidence value of 80% may be compared to a global maximum aggregate confidence value of 190% to generate an intensity value of 42105. As a maximum intensity value is equal to 100000, the intensity value of 42105 corresponds to a dark shade of gray.

The detector 102 may determine (1020) a strongest cluster of pixels (e.g., cluster of pixels associated with a highest intensity value or including a highest density of confidence values) and may determine (1022) a second strongest cluster of pixels (e.g., cluster of pixels associated with a second highest intensity value or including a second highest density of confidence values). For example, the strongest cluster of pixels may correspond to a strong true detection cluster (e.g., strong cluster) and the second strongest cluster of pixels may correspond to a strong false detection cluster (e.g., weak cluster), as discussed above with regard to FIGS. 5A-7D. As discussed in greater detail above, the detector 102 may use a mean shift clustering algorithm to determine the strongest cluster and the second strongest cluster.

The detector 102 may determine (1024) if the strongest cluster is separated from the second strongest cluster, for example based on results from the mean shift clustering algorithm.

If the detector 102 determines that the strongest cluster is not separated from the second strongest cluster, the detector 102 may increase (1026) the current scale parameter and loop to step 1014 to repeat steps 1014-1024 with the increased scale parameter, applying a stronger Gaussian kernel to the original confidence values (e.g., first confidence chart). Thus, each time the detector 102 performs step 1014 the detector 102 generates the first confidence chart with pixels included in the first region of interest being associated with the first confidence value.

If the detector 102 determines that the strongest cluster is separated from the second strongest cluster, the detector 102 may optionally determine (1028) a bandwidth parameter, which may be used to perform cluster analysis and determine a bounding box associated with the strongest cluster (e.g., performing the mean shift clustering algorithm from the scale parameter). For example, the detector 102 may determine the scale parameter σ, at which the strong cluster separates from the weak cluster and may store a value of the scale parameter σ, as the bandwidth parameter $\sigma_b$ and/or determine the bandwidth parameter $\sigma_b$ from the scale parameter σ, (e.g., as a fraction of the scale parameter $\sigma_s$, such as $\sigma_b = \sigma_s/3$). In this example, the scale parameter σ, may be used to determine the bandwidth parameter $\sigma_b$ because the width of the Gaussian kernel used to blur the regions of interest may correspond to a width of the cluster (e.g., window size). Thus, by determining at which scale parameter σ, the strong cluster separates from the weak cluster, the detector 102 may approximate the bandwidth parameter $\sigma_b$. However, the disclosure is not limited thereto and the scale parameter σ, and the bandwidth parameter $\sigma_b$ may vary without departing from the disclosure.

After determining that the strongest cluster is separated from the second strongest cluster, the detector 102 may use (1030) the heatmap generated from step 1018 for further processing, such as determining the bounding box as discussed in greater detail below with regard to FIG. 11.

Figure 11:
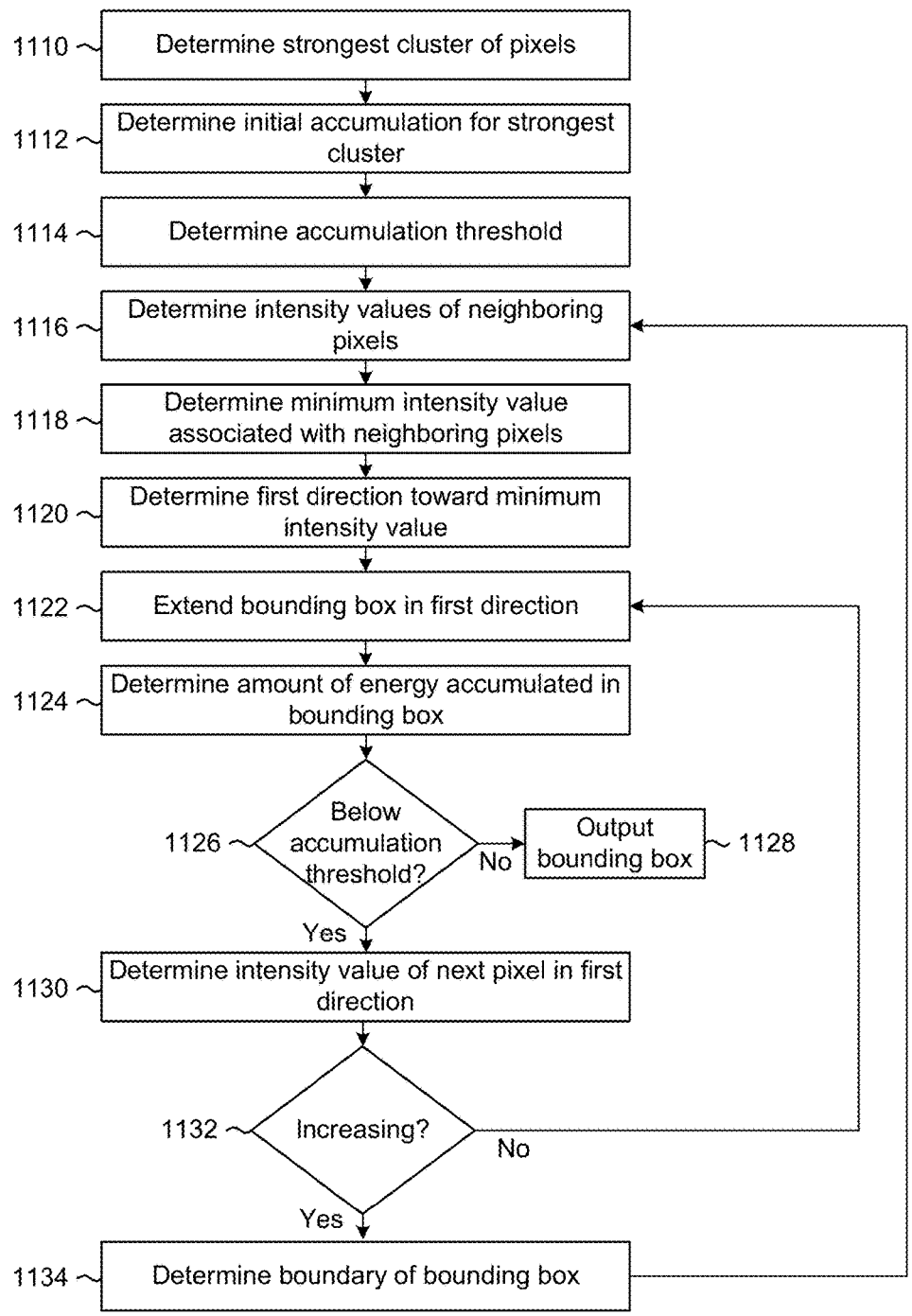
FIG. 11 is a flowchart conceptually illustrating an example method for determining a bounding box according to examples of the present disclosure.

FIG. 11 is a flowchart conceptually illustrating an example method for determining a bounding box according to examples of the present disclosure. As illustrated in FIG. 11, the detector 102 may perform a region growing algorithm (e.g., region-growth algorithm, region-based image segmentation or the like) to determine the bounding box. As illustrated in FIG. 11, the detector 102 may determine (1110) a strongest cluster of pixels, determine (1112) an initial accumulation for the strongest cluster and determine (1114) an accumulation threshold based on the initial accumulation. For example, the detector 102 may determine the strongest cluster using the mean shift clustering algorithm, including a location of a center of the strongest cluster and an estimate of pixels included in the strongest cluster, determine the initial accumulation by summing intensity values associated with pixels included in the strongest cluster, and determine the accumulation threshold as a percentage (e.g., 90%) of the initial accumulation.

The detector 102 may use the accumulation threshold to determine the bounding box using the region growing algorithm. The heatmap is a description of how energy is distributed, with output clusters (e.g., candidate regions of interest) indicating an area that human presence is detected. However, the detector 102 may be unable to clearly differentiate between the strong clusters and the weak clusters, so using the output of the mean shift clustering algorithm may result in bounding boxes that are too large. In addition, if a human is close to the camera, the output cluster (e.g., candidate region of interest) may be relatively large and not well concentrated, whereas if a human is far from the camera, the output cluster may be relatively small and compact (e.g., energy concentrated in small area). To improve the results of the mean shift clustering algorithm, the detector 102 may shrink a size of the output clusters (e.g., candidate regions of interest) based on the accumulation threshold.

To illustrate an example, the detector 102 may start with the global maximum (e.g., center of the strongest cluster) and gradually increase a size of the candidate region of interest until aggregated energy within the candidate region of interest (e.g., sum of intensity values) is equal to the accumulation threshold (e.g., until the candidate region of interest includes 90% of the initial accumulation). As part of the region growing algorithm, the detector 102 may grow the candidate region of interest from the global maximum towards lower intensity values surrounding the global maximum. For example, the detector 102 may grow the candidate region of interest in a direction of the lowest intensity values until it hits another cluster, which is determined by the intensity values beginning to increase. Once the intensity values begin to increase, the detector 102 determines that the intensity values are associated with a second cluster and stops growing in that direction, generating a boundary for the candidate region of interest. This is similar to a watershed transformation, but based on a region growing algorithm that grows in all directions. The region growing algorithm may decide how much energy will be introduced in each direction and select the minimum amount of energy that corresponds to the steepest location (e.g., intensity values decreasing at a highest rate). It continues to grow the candidate region of interest until it reaches the accumulation threshold, indicating that the candidate region of interest includes 90% of the energy included in the initial estimate of the strongest cluster.

As illustrated in FIG. 11, the detector 102 may determine (1116) intensity values of neighboring pixels around the global maximum or candidate region of interest, determine (1118) a minimum intensity value associated with the neighboring pixels, determine (1120) a first direction toward the minimum intensity value and extend (1122) the bounding box (e.g., candidate region of interest) in the first direction. For example, the detector 102 may determine the weakest energy around the candidate region of interest and grow in that direction, such that a minimum amount of energy is introduced to the candidate region of interest.

The detector 102 may determine (1124) an amount of energy accumulated in the candidate region of interest and may determine (1126) if the amount of energy is below the accumulation threshold. If the energy is not below the accumulation threshold (e.g., candidate region of interest includes 90% or more of the initial accumulation), the detector 102 may output (1128) the bounding box as the candidate region of interest. Thus, the candidate region of interest is represented by the bounding box and indicates an area that is associated with human presence.

If the amount of energy is below the accumulation threshold, the detector 102 may determine (1130) an intensity value of a next pixel in the first direction and determine (1132) if the intensity value is increasing relative to the previous intensity value. If the intensity value is not increasing, the detector 102 may loop to step 1122 and extend the bounding box in the first direction. If the intensity value is increasing, however, this indicates a boundary with another cluster and the detector 102 may determine (1134) a boundary of the bounding box and loop to step 1116. Thus, the detector 102 grows the bounding box in all directions until it reaches another cluster, at which point the detector 102 indicates a boundary of the bounding box and grows in other directions. The detector 102 continues to grow the bounding box until an amount of energy included in the bounding box is equal to the accumulation threshold and the detector 102 outputs the bounding box in step 1128.

As discussed above, the system 100 may use heatmap data to detect human presence and/or perform detection localization. However, the heatmap data may include true positive detections (e.g., cluster that corresponds to human presence) as well as false positive detections (e.g., a cluster that does not correspond to human presence). The false positive detections may correspond to an accurate detection of human presence caused by inanimate objects, such as objects (e.g., mannequin, doll, action figure, etc.), framed pictures, video being displayed on a television, or the like, or may correspond to inaccurate detection caused by errors in the computer vision processing, such as objects that are arranged in such a way that the computer vision is confused into thinking that a human is represented (e.g., objects mimic facial features or the like). The system 100 may detect and/or remove the false positive detections, but this requires additional processing and there may be a delay before the system 100 determines that a cluster corresponds to a false positive detection.

To improve a performance of the system 100, the system 100 may track false positive detections across multiple video frames. For example, the system 100 may generate heatmap base data corresponding to the false positive detections and may subtract the heatmap base data from heatmap data to remove the false positive detections. The modified heatmap data may be referred to as heatmap residual data and may be used to detect human presence and/or human localization with greater accuracy as the false positive detections have been reduced and/or removed. The heatmap base data may be updated periodically (e.g., each video frame, each time the system 100 generates heatmap data, every several video frames, when the system 100 generates heatmap data a certain number of times, etc.) and may be used with heatmap data generated over a period of time.

Figure 12:
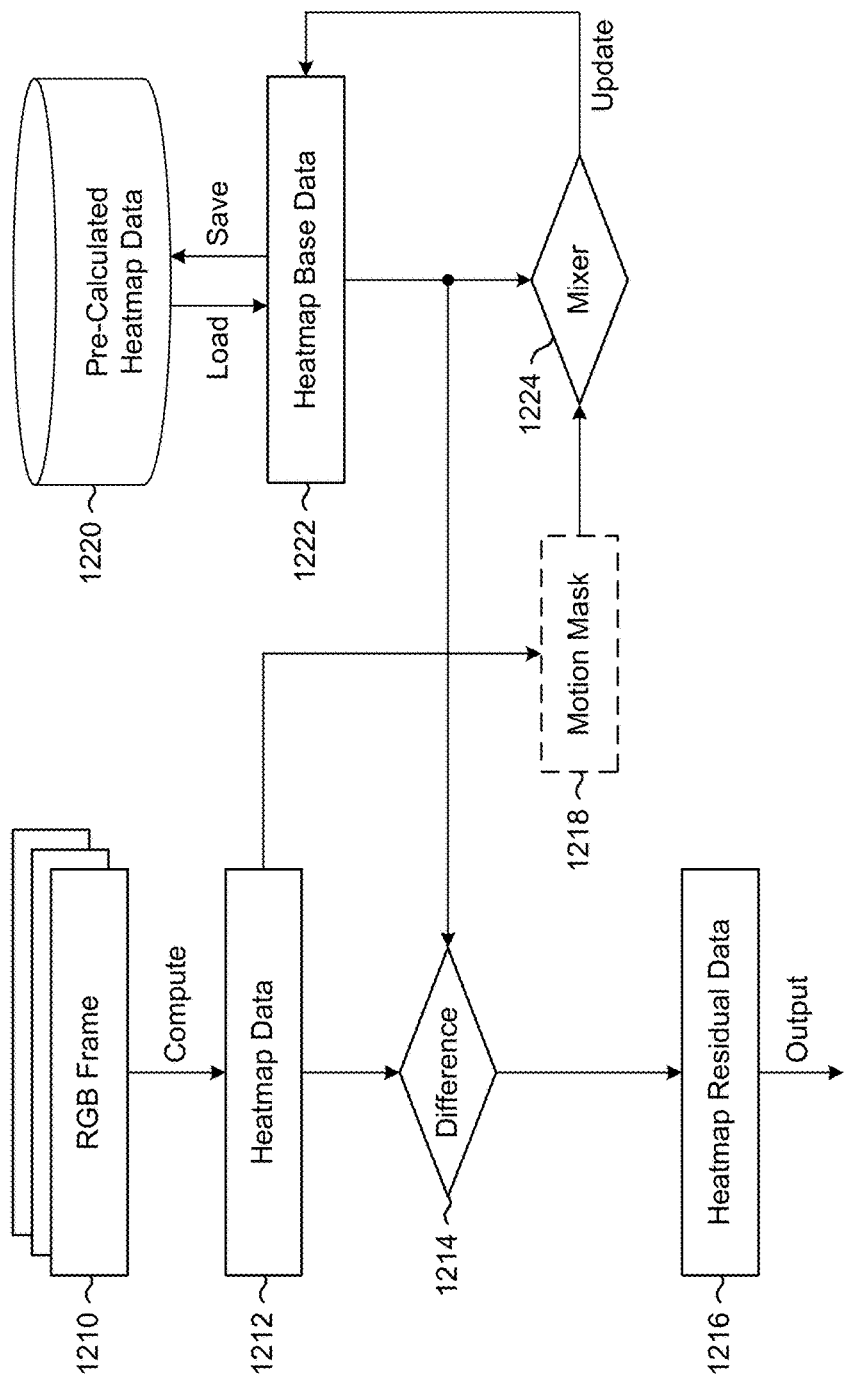
FIG. 12 illustrates an example of tracking false positive detections across multiple video frames according to examples of the present disclosure.

FIG. 12 illustrates an example of tracking false positive detections across multiple video frames according to examples of the present disclosure. As illustrated in FIG. 12, an RGB frame 1210 may be used as image data to compute heatmap data 1212. For example, the RGB frame 1210 may be one of a series of video frames included in video data, and the system 100 may generate the heatmap data 1212 for at least a portion of the video frames using the steps illustrated in FIG. 9. However, the disclosure is not limited to heatmap data, and the techniques illustrated in FIG. 12 may be used for aggregate confidence values, individual confidence values or the like without departing from the disclosure.

The system 100 may include a database that stores pre-calculated heatmap data 1220, such as heatmap base data 1222. For example, the system 100 may continuously update the heatmap base data 1222 and store the heatmap base data 1222 as the pre-calculated heatmap data 1220. To remove or reduce the false positive detections, the system 100 may load the heatmap base data 1222 and may determine the difference 1214 between the heatmap data 1212 and the heatmap base data 1222, which results in heatmap residual data 1216. Thus, the system 100 may subtract the heatmap base data 1222 from the heatmap data 1212 to generate the heatmap residual data 1216. For example, the system 100 may reduce pixel intensity values of the heatmap data 1212 using corresponding pixel intensity values of the heatmap base data 1222 to generate the heatmap residual data 1216. As a result, false positive detections included in the heatmap base data 1222 may be removed and/or reduced in the heatmap residual data 1216.

To update the heatmap base data 1222, the system 100 may optionally generate a motion mask 1218 and may generate updated heatmap base data 1222 using the existing heatmap base data 1222 and the heatmap data 1212, as will be discussed in greater detail below with regard to FIGS. 14A-14C. For example, the system 100 may detect motion between video frames (e.g., changes in image data corresponding to motion of an object or the like) and the motion mask 1218 may include individual pixels that correspond to the motion. Thus, the motion mask 1218 distinguishes pixels associated with motion from static pixels included in one or more static areas. In some examples, the system 100 may use the motion mask 1218 to optionally update the heatmap base data 1222 only in the one or more static areas.

In some examples, the system 100 may update the heatmap base data in realtime while capturing image data (e.g., video data). Thus, the heatmap base data may update over time in a sequential manner, with false positive detections being added or removed from the heatmap base data depending on conditions. However, the disclosure is not limited thereto and the system 100 may instead update the heatmap base data offline (e.g., after capturing all of the video data) without departing from the disclosure. Thus, the heatmap base data may be updated based on every single video frame, including both previous video frames (e.g., video frames in the past relative to a current video frame) and subsequent video frames (e.g., video frames in the future relative to the current video frame).

In some examples, the system 100 may update the heatmap base data based on user feedback. For example, a user may input to the system 100 desired weights/update speed and/or may indicate whether there is a human or isn't a human present in image data displayed on a display. The system 100 may use this input to determine parameters for updating the heatmap base data and/or to determine whether a strong cluster corresponds to a true positive detection (e.g., human is present) or a false positive detection (e.g., human is not present) and update the heatmap base data accordingly. While user feedback may be acquired during realtime capture, more user feedback may be available during offline capture.

In some examples, the system 100 may provide feedback to the user based on the heatmap base data. For example, the system 100 may indicate that there is an issue (e.g., false positive detection) and/or a location associated with the issue, such that the user may change the environment (e.g., move objects, change lighting, etc.) to remove a persistent false positive detection. Thus, the system 100 may instruct the user and/or provide additional information to the user to enable the user to improve the human presence detection and/or localization.

In some examples, the heatmap base data may be stored as normalized data based on a strongest pixel intensity value present in the heatmap data. For example, the system 100 may detect the strongest pixel intensity value in the heatmap data (e.g., global maximum) and normalize the heatmap base data by dividing each pixel of the heatmap base data by the strongest pixel intensity value, such that each pixel of the normalized heatmap base data (e.g., normalized pixel intensity data or normalized pixel intensity values) corresponds to a value between 0 and 1. The system 100 may then store the normalized heatmap base data and the strongest pixel intensity value. To reconstruct the heatmap base data, the system 100 may multiply the normalized heatmap base data by the strongest pixel intensity value.

The system 100 may generate and use the normalized heatmap base data as it is adaptive to different environments and/or changes over time. For example, pixel intensity values in the heatmap data may vary depending on the environment (e.g., different scenes represented in the image data), changes to the environment (e.g., motion or different objects represented in the image data), time (e.g., identical scene has different pixel intensity values at different times), due to transient changes and/or randomly between video frames (e.g., due to noise or other distortion). In some examples, subsequent video frames may have different pixel intensity values. If the system 100 uses the absolute (e.g., not normalized) pixel intensity values as the heatmap base data, these changes may result in errors or poor results due to the differences in the pixel intensity values. However, if the normalized pixel intensity values are used, the system 100 may compensate for these changes provided the relative pixel intensity values remain the same. For example, the system 100 may detect a current strongest pixel intensity value in the current heatmap and may reconstruct the heatmap base data by multiplying each pixel of the normalized heatmap base data by the current strongest pixel intensity value.

Thus, the normalized heatmap base data may be less sensitive to transient changes and may be more stable over time. In addition, the system 100 may separately update the normalized heatmap base data and the strongest pixel intensity value. For example, the system 100 may learn scores (e.g., the strongest pixel intensity value) slowly over time, but can update the distribution of the heatmap (e.g., heatmap base data) at a faster rate. In some examples, the system 100 may store the normalized heatmap base data as an image (e.g., using a Portable Network Graphics (PNG) protocol, Joint Photographic Experts Group (JPEG or JPG) protocol, or the like).

FIG. 13 illustrates an example of using heatmap base data to remove false positive detections according to examples of the present disclosure. As illustrated in FIG. 13, the system 100 may generate heatmap 1310 comprising heatmap data. The heatmap 1310 may include a true positive detection 1312 along with a first false positive detection 1314*a* and a second false positive detection 1314*b*. Based on previous heatmaps, the system 100 may generate heatmap base 1320 comprising heatmap base data, which includes the first false positive detection 1314*a* and the second false positive detection 1314*b*. By subtracting the heatmap base data from the heatmap data, the system 100 may generate heatmap residual 1330, comprising heatmap residual data, which only includes the true positive detection 1312. Thus, the heatmap base data including the first false positive detection 1314*a* and the second false positive detection 1314*b* may be updated and used to remove the first false positive detection 1314*a* and the second false positive detection 1314*b* from multiple heatmaps over a period of time. This is particularly useful when the false positive detections 1314 are based on motionless objects and therefore remain constant over time.

Figure 14A:
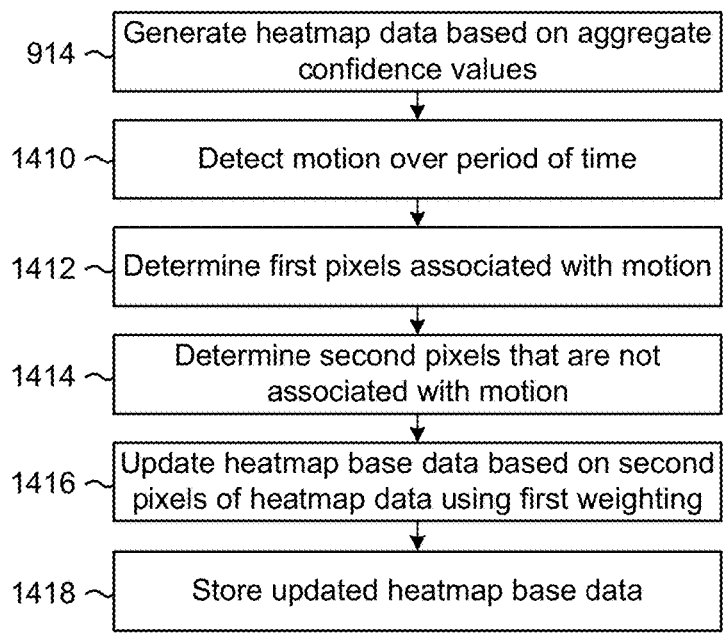
Figure 14B:
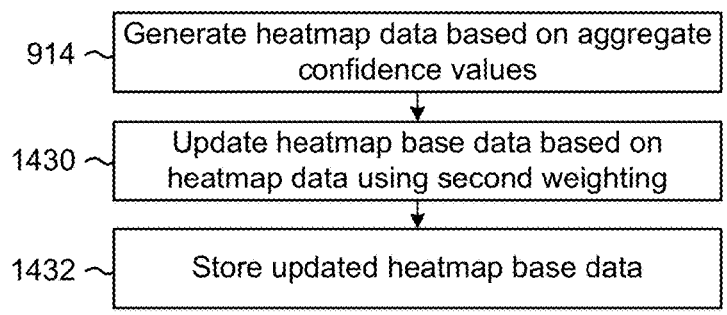

FIG. 14A-14C are flowcharts conceptually illustrating example methods for updating heatmap base data according to examples of the present disclosure. The system 100 may update the heatmap base data using multiple techniques, including a first technique that includes a motion mask to only update a portion of the heatmap base data and a second technique that updates an entirety of the heatmap base data very slowly. The system 100 may update the heatmap base data using the following equation:

$$\text{Heatmap}_{Base} = (\text{Heatmap}_{Base} * W_1 + \text{Heatmap} * W_2)/(W_1 + W_2)$$

where $\text{Heatmap}_{Base}$ is a pixel intensity value in the heatmap base data, $W_1$ is a first weight (e.g., aggregation factor) indicating a priority associated with the existing pixel intensity values in the heatmap base data, Heatmap is a pixel intensity value in the heatmap data, and $W_2$ is a second weight (e.g., update factor) indicating a priority associated with the current pixel intensity values in the heatmap data. Typically, the sum of the first weight $W_1$ and the second weight $W_2$ is equal to one, although the disclosure is not limited thereto.

In some examples, the system 100 may determine the first weight $W_1$ and the second weight $W_2$ based on a frame rate of the video data. For example, a slower frame rate (e.g., 5 frames per second) would correspond to a higher second weight $W_2$ (e.g., greater emphasis on current pixel intensity data) whereas a faster frame rate (e.g., 60 frames per second) would correspond to a lower second weight $W_2$ (e.g., lower emphasis on current pixel intensity data). Thus, the different weights offset the different frame rates, resulting in a similar rate of updating the heatmap base data. For example, a first weight $W_1$ of 0.95 and the second weight $W_2$ of 0.05 would update over 100 frames, which at 60 frames per second occurs in less than 2 seconds but at 5 frames per second occurs over 20 seconds. Thus, if the system 100 wants to update over 20 seconds, the system 100 would use the first weight $W_1$ of 0.95 and the second weight $W_2$ of 0.05 while capturing image data at 5 frames per second and a first weight $W_1$ of 0.9958 and a second weight $W_2$ of 0.0042 while capturing image data at 60 frames per second.

In some examples, the system 100 may determine different weights based on the conditions in the environment represented in the image data. To illustrate a first example, the system 100 may use different weights depending on the time of day. For example, the system 100 may update the heatmap base data more quickly at night than during the day time, as there may be less activity (e.g., fewer people moving around in the environment) at night. To illustrate a second example, the system 100 may use different weights depending on lighting conditions in the environment. For example, when lights are off and the image data is relatively dark, the system 100 may update quickly, whereas when lights are on and the image data is relatively bright, the system 100 may update more slowly. These examples are intended for illustrative purposes only and the disclosure is not limited thereto. Instead, the system 100 may dynamically adjust the weights based on any condition present in the image data or associated with the image data.

Using the first technique, the system 100 may detect motion and determine a motion mask. The system 100 may detect motion represented in image data and/or video data (e.g., motion may be detected between consecutive frames of image data, over several frames of image data corresponding to a period of time, or over the course of an entire video clip) and generate the motion mask, which indicates portions of the image data that are static (e.g., not associated with the motion). Using the motion mask, the system 100 only updates the heatmap base data for the portions of the image data that are static, ignoring the portions of the image data that are not static. As humans move frequently, this prevents the system 100 from including true positive detections in the heatmap base data, with the static areas of the image data corresponding to false positive detections (e.g., inanimate objects, framed pictures, video being displayed, etc.).

In contrast, the second technique updates every pixel in the heatmap base data without regard to motion. Instead, the second technique uses lower weights for current pixel intensity values in the heatmap data, prioritizing the previous pixel intensity values in the heatmap base data, which means that the heatmap base data changes very slowly over time. As current pixel intensity values are weighted very low relative to previous pixel intensity values, the heatmap base data is not strongly affected by humans being represented in the image data for brief periods of time, as the pixels associated with the human presence change relatively quickly (e.g., humans move throughout the image data). In contrast, pixels associated with static objects that correspond to false positive detections do not change quickly (e.g., inanimate objects do not move frequently) and the heatmap base data tracks these false positive detections over time, The first technique updates relatively quickly, which allows the system 100 to identify and remove false positive detections in a short amount of time. However, due to the larger weights used in the first technique, the first technique may mistakenly include a true positive detection in the heatmap base data. For example, pixels corresponding to a motional human may be included in the heatmap base data by mistake. In addition, the first technique may be unable to add false positive detections in areas with lots of motion, as these areas are not included in the motion mask. In contrast, the second technique updates relatively slowly, which means that the system 100 may not quickly remove false positive detections, but the second technique is less likely to include true positive detections by mistake and is able to add false positive detections in areas with lots of motion.

As illustrated in FIG. 14A, the system 100 may generate (914) heatmap data based on aggregate confidence values, which is described in greater detail above with regard to FIG. 9. The system 100 may detect (1410) motion over a period of time, determine (1412) first pixels associated with the motion and may determine (1414) second pixels that are not associated with the motion (e.g., static pixels). The system 100 may therefore update (1416) the heatmap base data based on the second pixels of the heatmap data using a first weighting and may store (1418) the updated heatmap base data.

As illustrated in FIG. 14B, the system 100 may generate (914) heatmap data based on aggregate confidence values, which is described in greater detail above with regard to FIG. 9, may update (1430) the heatmap base data based on an entirety of the heatmap data using a second weighting and may store (1432) the updated heatmap base data. The second weighting may be a fraction of the first weighting, such as the second weight $W_2$ being a value of 0.01 for the first technique (e.g., 1% of the pixel intensity value associated with the heatmap data is added to 99% of the existing pixel intensity value associated with the heatmap base data) and a value of 0.001 for the second technique (e.g., 0.1% of the pixel intensity value associated with the heatmap data is added to 99.9% of the existing pixel intensity value associated with the heatmap base data). Thus, in this example the first weighting would update at least ten times faster than the second weighting, although this is intended for illustrative purposes only and the disclosure is not limited thereto. Instead, the second weighting could be even lower, such that the heatmap base data updates over several seconds using the first technique and over several minutes using the second technique.

In some examples, steps 1416 and/or 1430 may only update the heatmap base data when a pixel intensity value exceeds a threshold value. For example, the system 100 may ignore pixel intensity values in the heatmap data that are below the threshold value, only increasing the heatmap base data for pixel intensity values that are above the threshold value and therefore are more likely to correspond to a false positive detection. However, the disclosure is not limited thereto and the system 100 may update the heatmap base data without regard to the pixel intensity value without departing from the disclosure.

In some examples, the system 100 may track the heatmap base data using both the first technique and the second technique and may select between them based on current conditions. For example, the system 100 may select the heatmap base data generated using the first technique when there has been a relatively small amount of motion and the motion mask is limited, and may select the heatmap base data generated using the second technique when there has been a relatively large amount of motion and the motion mask is expansive. As illustrated in FIG. 14C, the system 100 may perform steps 1410-1418 illustrated in FIG. 14A to store first heatmap base data and may perform steps 1430-1432 illustrated in FIG. 14B to store second heatmap base data. When the system 100 needs to use heatmap base data, the system 100 may determine (1450) to select the first heatmap base data or the second heatmap base data based on current conditions.

In some examples, the system 100 may select the first heatmap base data when there has been a relatively small amount of motion and the motion mask is limited, and may select the second heatmap base data when there has been a relatively large amount of motion and the motion mask is expansive. Additionally or alternatively, the system 100 may select the first heatmap base data when the system 100 is able to generate a clear motion mask (e.g., motion is smooth, corresponds to only a portion of the image data, etc.) and the system 100 may select the second heatmap base data when the system 100 is unable to generate a clear motion mask (e.g., motion is erratic, corresponds to a majority of the image data, etc.).

In some examples, the system 100 may select the first heatmap base data when the system 100 detects higher complexity motion and may select the second heatmap base data when the system 100 detects lower complexity motion. For example, higher complexity motion may correspond to real object movement, such as an object or person represented in the image data moving around an environment. In contrast, lower complexity motion may correspond to pixel noise or other distortion, lighting changes to the environment (e.g., angle of sun changing, shadows moving over time, etc.), minor movement within the environment (e.g., grass blowing in the wind, trees swaying, etc.) or the like. Thus, the higher complexity motion can be tracked and masked, whereas the lower complexity motion exists throughout the image data.

FIGS. 15A-15B illustrate examples of updating heatmap base data using two different techniques according to examples of the present disclosure. As illustrated in FIG. 15A, the system 100 may update the heatmap base data using a first technique, which detects a static area 1512 corresponding to static pixels and only updates the first heatmap base 1520*a* using the static area 1512 of the heatmap 1510. For example, the system 100 may detect the static area 1512 by generating a motion mask that indicates that the remaining portion of the heatmap 1510 (e.g., outside of the static area 1512) corresponds to motion. The system 100 may update the first heatmap base 1520*a* using the first weighting (e.g., $W_1$=0.99, $W_2$=0.01). To illustrate the first weighting, the first false positive detection 1314*a* and the second false positive detection 1314*b* are shown only slightly faded relative to the heatmap 1510.

For ease of explanation, FIG. 15A illustrates a single static area 1512. However, the disclosure is not limited to a single static area and the system 100 may identify multiple static areas, which may overlap in whole or in part, without departing from the disclosure. While the static area 1512 is illustrated as a rectangle, the static area 1512 is not limited to a rectangular shape and may instead correspond to individual pixels without departing from the disclosure. Thus, the motion mask may correspond to individual pixels that are associated with motion and the remaining pixels may be included in one or more static areas 1512.

As illustrated in FIG. 15B, the system 100 may update the heatmap base data using a second technique, which uses the heatmap 1510 to update second heatmap base 1520*b* without regard to motion. The system 100 may update the second heatmap base 1520b using the second weighting (e.g., $W_1$=0.999, $W_2$=0.001). To illustrate the second weighting, the first false positive detection 1314a and the second false positive detection 1314b are shown very faded relative to the heatmap 1510, as only a small percentage of the pixel intensity value is used to increase the heatmap base 1520b.

FIG. 16 is a flowchart conceptually illustrating an example method for detecting human presence or performing detection localization after removing false positive detections according to examples of the present disclosure. As illustrated in FIG. 16, the system 100 may generate (914) heatmap data based on aggregate confidence values, which is described in greater detail above with regard to FIG. 9. If the system 100 tracks the false positive detections using both techniques, the system 100 may optionally determine (1450) to select the first heatmap base data or the second heatmap base data based on current conditions. Otherwise, the system 100 may use the only heatmap base data that is available.

The system 100 may subtract (1610) the heatmap base data (e.g., selected in step 1450 or the only heatmap base data that is available) from the heatmap data to generate heatmap residual data and may determine (1612) a global maximum value in the heatmap residual data. Using the global maximum value (e.g., highest pixel intensity value), the system 100 may perform steps 824-828, which are described in greater detail above with regard to FIG. 8, to determine whether human presence is detected, and/or perform steps 916-918, which are described in greater detail above with regard to FIG. 9, to determine a bounding box corresponding to the human presence (e.g., detection localization). Thus, the heatmap residual data may be used to perform human presence detection and/or localization as described above, with increased accuracy caused by reducing and/or removing the false positive detections.

While the examples illustrated above refer to tracking the false positive detections using heatmap data, the disclosure is not limited thereto. Instead, the system 100 may track the false positive detections using confidence values, aggregate confidence values or the like without departing from the disclosure. For example, the system 100 may determine one or more regions of interest that correspond to the false positive detections, individual confidence values that correspond to the regions of interest and/or aggregate confidence values that correspond to the regions of interest, and may store the one or more regions of interest, the individual confidence values and/or the aggregate confidence values in a database. The system 100 may then subtract the individual and/or aggregate confidence values stored in the database from the aggregate confidence values determined in step 820 to reduce the effect of the false positive detections when detecting human presence. Additionally or alternatively, the system 100 may subtract the individual and/or aggregate confidence values stored in the database from a single confidence value determined in step 814 to reduce the effect of the false positive detections when detecting human presence. Thus, while the examples described above illustrate the false positive detections being used to modify heatmap data and/or aggregate confidence values, the disclosure is not limited thereto and the false positive detections may be used to modify a confidence value corresponding to a single region of interest without departing from the disclosure.

Figure 17:
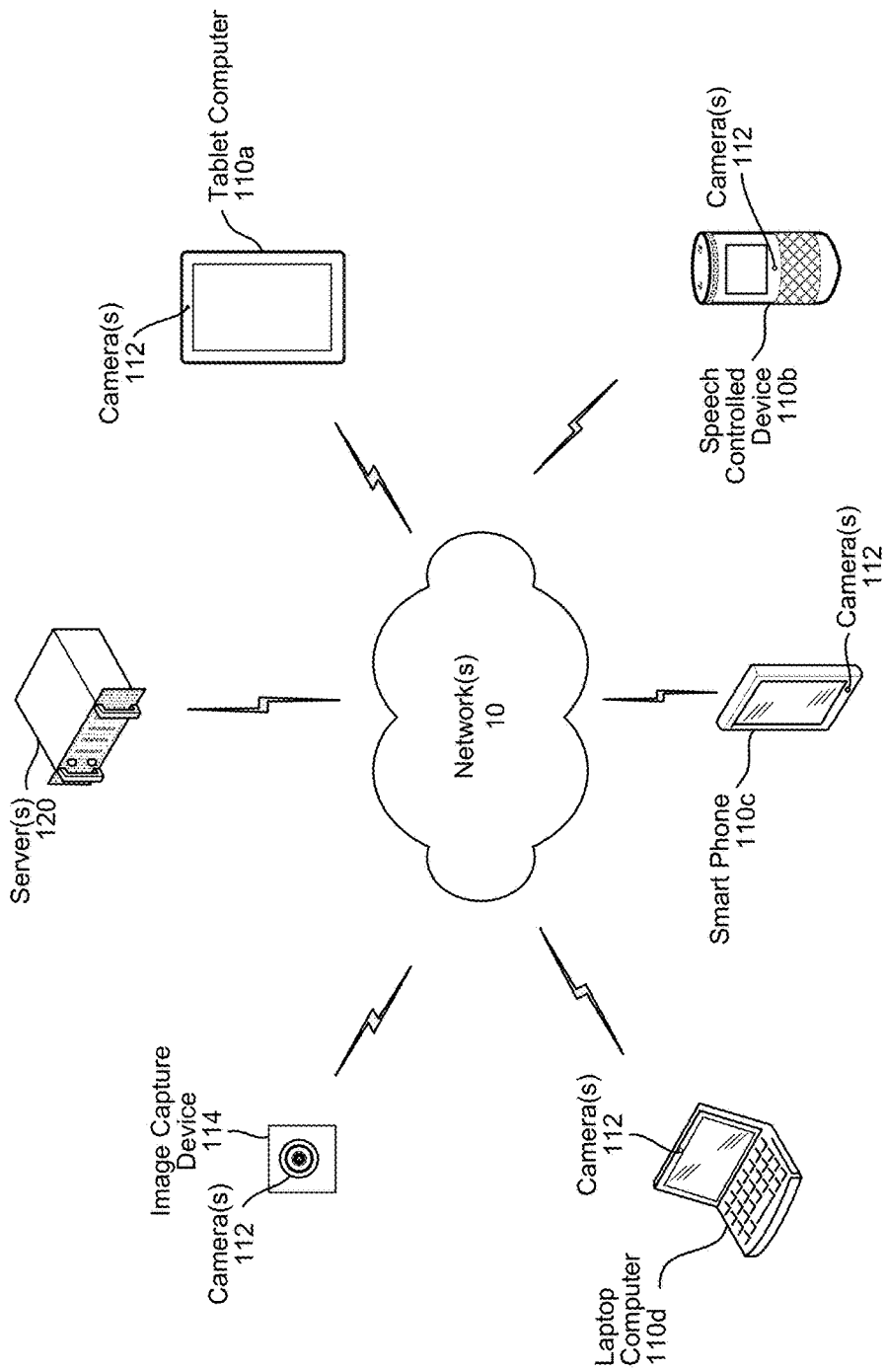
FIG. 17 illustrates an example of a computer network for use with the system.

As illustrated in FIG. 17 devices 110 and/or server(s) 120 may contain components of the system 100 and may be connected over network(s) 10. The network(s) 10 may be a local or private network or may be part of a wider network. Devices 110/server(s) 120 may be connected to the network(s) 10 through either wired or wireless connections. For example, a tablet computer 110a, a speech controlled device 110b, a smart phone 110c, a laptop computer 110d, an image capture device 114, and/or server(s) 120 may be connected to the network(s) 10 through a wired and/or wireless connection.

In some examples, the device 110 may include the detector 102 and may process image data using the detector 102 to perform presence detection and/or detection localization. For example, the device 110 may include camera(s) 112 and may generate image data using the camera(s) 112. Additionally or alternatively, an image capture device 114 or a remote device 110 may include camera(s) 112 and may generate image data using the camera(s) 112. Therefore, the device 110 may receive the image data from the remote device 110/image capture device 114 via the network(s) 10 without departing from the disclosure.

Figure 18:
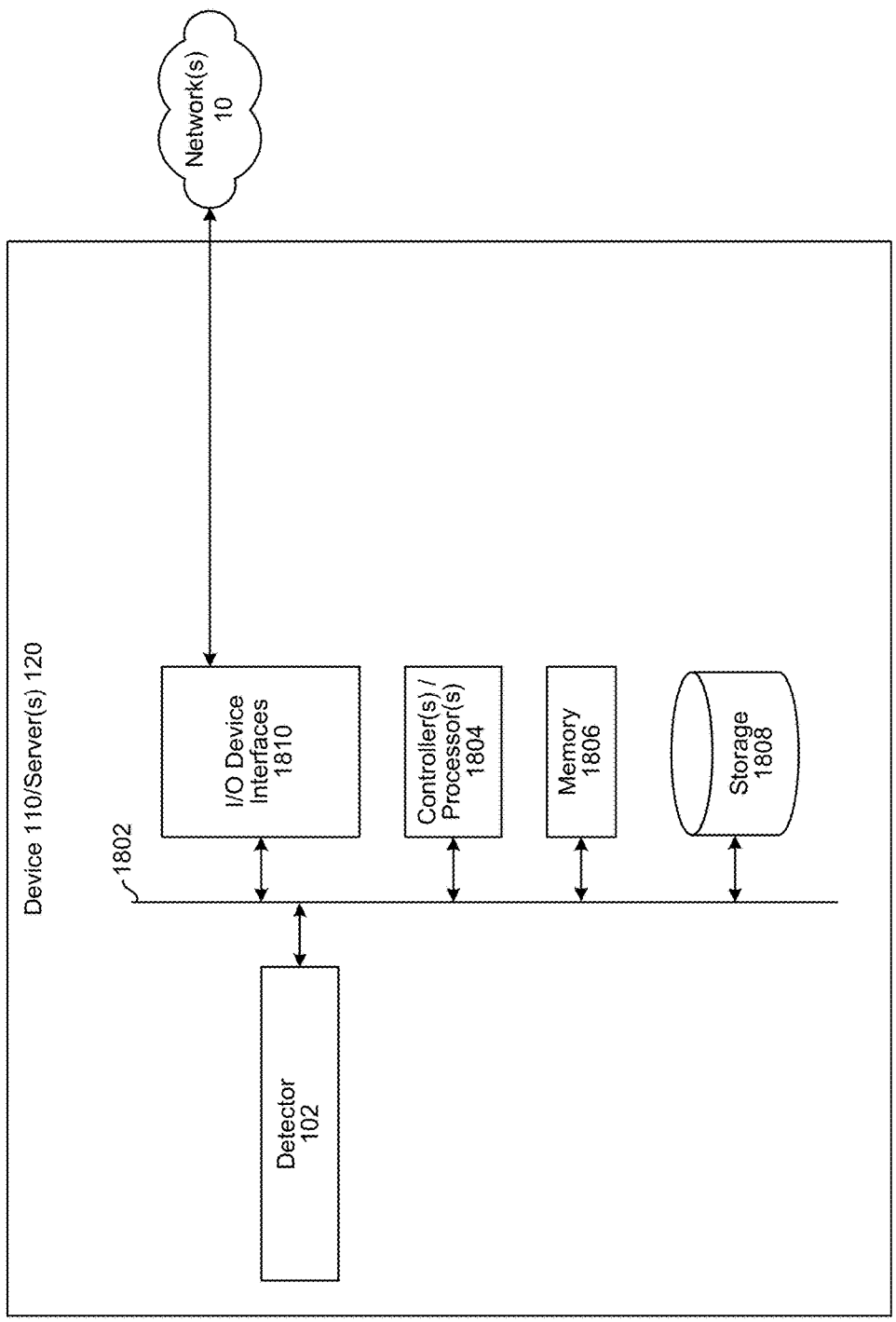
FIG. 18 is a block diagram conceptually illustrating example components of a system according to embodiments of the present disclosure.

The disclosure is not limited thereto, however, and in other examples the server(s) 120 may include the detector 102 and may process the image data using the detector 102 to perform presence detection and/or detection localization. For example, the device 110 and/or the image capture device 114 may generate the image data using the camera(s) 112 and the server(s) 120 may receive the image data from the device 110/image capture device 114 via the network(s) 10 without departing from the disclosure FIG. 18 is a block diagram conceptually illustrating example components of a system for improved presence detection and/or detection localization according to embodiments of the present disclosure. In operation, the system 100 may include computer-readable and computer-executable instructions that reside on the device 110 and/or server(s) 120, as will be discussed further below.

As illustrated in FIG. 18, the device 110/server(s) 120 may include an address/data bus 1802 for conveying data among components of the device 110/server(s) 120. Each component within the device 110/server(s) 120 may also be directly connected to other components in addition to (or instead of) being connected to other components across the bus 1802.

The device 110/server(s) 120 may include one or more controllers/processors 1804, which may each include a central processing unit (CPU) for processing data and computer-readable instructions, and a memory 1806 for storing data and instructions. The memory 1806 may include volatile random access memory (RAM), non-volatile read only memory (ROM), non-volatile magnetoresistive (MRAM) and/or other types of memory. The device 110/server(s) 120 may also include a data storage component 1808, for storing data and controller/processor-executable instructions (e.g., instructions to perform the algorithm illustrated in FIGS. 1, 8, 9, 10 and/or 11). The data storage component 1808 may include one or more non-volatile storage types such as magnetic storage, optical storage, solid-state storage, etc. The device 110/server(s) 120 may also be connected to removable or external non-volatile memory and/or storage (such as a removable memory card, memory key drive, networked storage, etc.) through the input/output device interfaces 1810.

The device 110/server(s) 120 includes input/output device interfaces 1810. A variety of components may be connected through the input/output device interfaces 1810. The input/output device interfaces 1810 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s)

10 may include a local or private network or may include a wide network such as the internet. Devices may be connected to the network(s) 10 through either wired or wireless connections.

In some examples, the device 110 may include the detector 102 and may process image data using the detector 102 to perform presence detection and/or detection localization. For example, the device 110 may be connected to camera(s) 112 through the input/output device interfaces 1810, although the disclosure is not limited thereto. When the camera(s) 112 are connected to the device 110, the camera(s) 112 may generate image data and the device 110 may receive the image data via the input/output device interfaces 1810. Additionally or alternatively, an image capture device 114 or a remote device 110 may include camera(s) 112 and may generate image data using the camera(s) 112. Therefore, the device 110 may receive the image data from the remote device 110/image capture device 114 via the network(s) 10 without departing from the disclosure.

The disclosure is not limited thereto, however, and in other examples the server(s) 120 may include the detector 102 and may process the image data using the detector 102 to perform presence detection and/or detection localization. For example, the device 110 and/or the image capture device 114 may generate the image data using the camera(s) 112 and the server(s) 120 may receive the image data from the device 110/image capture device 114 via the network(s) 10 without departing from the disclosure The input/output device interfaces 1810 may also include an interface for an external peripheral device connection such as universal serial bus (USB), FireWire, Thunderbolt, Ethernet port or other connection protocol that may connect to network(s) 10. The input/output device interfaces 1810 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110/server(s) 120 may include a detector 102, as discussed in greater detail above. This component may comprise processor-executable instructions stored in storage 1808 to be executed by controller(s)/processor(s) 1804 (e.g., software, firmware, hardware, or some combination thereof). For example, components of the detector 102 may be part of a software application running in the foreground and/or background on the device 110/server(s) 120. Some or all of the controllers/components of the detector 102 may be executable instructions that may be embedded in hardware or firmware in addition to, or instead of, software. In one embodiment, the device 110/server(s) 120 may operate using an Android operating system (such as Android 4.3 Jelly Bean, Android 4.4 KitKat or the like), an Amazon operating system (such as FireOS or the like), or any other suitable operating system.

Executable computer instructions for operating the device 110/server(s) 120 and its various components may be executed by the controller(s)/processor(s) 1804, using the memory 1806 as temporary "working" storage at runtime. The executable instructions may be stored in a non-transitory manner in non-volatile memory 1806, storage 1808, or an external device. Alternatively, some or all of the executable instructions may be embedded in hardware or firmware in addition to or instead of software.

The components of the device 110/server(s) 120, as illustrated in FIG. 18, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for determining whether human presence is detected, comprising:
    receiving first image data;
    determining a first portion of the first image data, the first portion including a first plurality of pixels including a first pixel;
    determining a first confidence value for the first portion, the first confidence value corresponding to a probability that at least a portion of a human is represented in the first portion;
    determining a second portion of the first image data, the second portion including a second plurality of pixels including the first pixel;
    determining a second confidence value for the second portion, the second confidence value corresponding to a probability that at least a portion of a human is represented in the second plurality of pixels;
    determining a first aggregate confidence value corresponding to the first pixel, the first aggregate confidence value being a sum of the first confidence value and the second confidence value;
    determining, based on the first aggregate confidence value, a first pixel intensity value corresponding to the first pixel;
    receiving second pixel intensity data corresponding to reference values to remove from the first pixel intensity data;
    determining, based on the second pixel intensity data, a second pixel intensity value corresponding to the first pixel;
    determining a third pixel intensity value by subtracting the second pixel intensity value from the first pixel intensity value;
    determining that the third pixel intensity value is above a presence detection threshold value; and
    determining, based on the third pixel intensity value being above the presence detection threshold value, that at least a portion of a human is represented in the first image data.

2. The computer-implemented method of claim 1, further comprising:
    selecting, from a preprogrammed set of weight values, a first weight value associated with the first pixel intensity data;
    selecting, from the preprogrammed set of weight values, a second weight value associated with the second pixel intensity data;
    determining a first product of the first pixel intensity value and the first weight value;
    determining a second product of the second pixel intensity value and the second weight value;
    determining a fourth pixel intensity value by summing the first product and the second product; and
    replacing the second pixel intensity value in the second pixel intensity data with the fourth pixel intensity value.

3. The computer-implemented method of claim 1, further comprising:
    detecting motion represented in the first image data;
    determining a first plurality of pixels associated with the detected motion;
    determining a second plurality of pixels that are not associated with the detected motion;
    determining a second pixel included in the second plurality of pixels;
    determining a fourth pixel intensity value in the first pixel intensity data that corresponds to the second pixel;
    determining a fifth pixel intensity value in the second pixel intensity data that corresponds to the second pixel;
    determining, based on a weighted sum the fourth pixel intensity value and the fifth pixel intensity value, a sixth pixel intensity value; and
    replacing the fifth pixel intensity value in the second pixel intensity data with the sixth pixel intensity value.

4. The computer-implemented method of claim 1, further comprising:
    detecting motion in the first image data;
    determining a first plurality of pixels associated with the detected motion;
    determining a second plurality of pixels that are not associated with the detected motion;
    determining, based on the second pixel intensity data and the first pixel intensity data associated with the second plurality of pixels, fourth pixel intensity data using a first weight value; and
    determining, based on the first pixel intensity data and the second pixel intensity data, fifth pixel intensity data using a second weight value that is lower than the first weight value.

5. A computer-implemented method, comprising:
    receiving first image data;
    determining a first portion of the first image data, the first portion including a first plurality of pixels including a first pixel;
    determining a first confidence value for the first portion, the first confidence value corresponding to a probability that at least a portion of a human is represented in the first portion;
    determining, based on the first confidence value, first pixel intensity data, the first pixel intensity data including a first pixel intensity value corresponding to the first pixel;
    receiving second pixel intensity data to remove from the first pixel intensity data, the second pixel intensity data corresponding to reference values;
    determining, based on the second pixel intensity data, a second pixel intensity value corresponding to the first pixel;
    determining third pixel intensity data, the third pixel intensity data including a third pixel intensity value determined by subtracting the second pixel intensity value from the first pixel intensity value; and determining, based on the third pixel intensity data, that at least a portion of a human is represented in the first image data.

6. The computer-implemented method of claim 5, further comprising:

determining that the first pixel does not represent a portion of a human;

determining, based on a weighted sum of the first pixel intensity value and the second pixel intensity value, a fourth pixel intensity value; and replacing the second pixel intensity value in the second pixel intensity data with the fourth pixel intensity value.

7. The computer-implemented method of claim 5, further comprising:

selecting, from a preprogrammed set of weight values, a first weight value associated with the first pixel intensity data;

selecting, from the preprogrammed set of weight values, a second weight value associated with the second pixel intensity data;

determining a first product of the first pixel intensity value and the first weight value;

determining a second product of the second pixel intensity value and the second weight value;

determining a fourth pixel intensity value by summing the first product and the second product; and replacing the second pixel intensity value in the second pixel intensity data with the fourth pixel intensity value.

8. The computer-implemented method of claim 7, further comprising:

determining a frame rate associated with the first image data;

determining, based on the frame rate, the first weight value, a higher frame rate corresponding to a lower value of the first weight value relative to a lower frame rate; and determining the second weight value by subtracting the first weight value from a value of one.

9. The computer-implemented method of claim 5, further comprising:

detecting motion represented in the first image data;

determining a first plurality of pixels associated with the detected motion;

determining a second plurality of pixels that are not associated with the detected motion;

determining a second pixel included in the second plurality of pixels;

determining a fourth pixel intensity value in the first pixel intensity data, the fourth pixel intensity value corresponding to the second pixel;

determining a fifth pixel intensity value in the second pixel intensity data, the fifth pixel intensity value corresponding to the second pixel;

determining, based on the fourth pixel intensity value and the fifth pixel intensity value, a sixth pixel intensity value; and replacing the fifth pixel intensity value in the second pixel intensity data with the sixth pixel intensity value.

10. The computer-implemented method of claim 5, further comprising:

receiving normalized pixel intensity data to remove from the first pixel intensity data, the normalized pixel intensity data corresponding to the reference values and are normalized to have values between zero and one;

receiving a fourth pixel intensity value, the fourth pixel intensity value corresponding to a highest pixel intensity value associated with the normalized pixel intensity data; and generating the second pixel intensity data by multiplying the normalized pixel intensity data and the fourth pixel intensity value, a highest pixel intensity value of the second pixel intensity data corresponding to the fourth pixel intensity value.

11. The computer-implemented method of claim 5, further comprising:

detecting motion in the first image data;

determining a first plurality of pixels associated with the detected motion;

determining a second plurality of pixels that are not associated with the detected motion;

determining, based on the second pixel intensity data and the first pixel intensity data associated with the second plurality of pixels, fourth pixel intensity data using a first weight value; and determining, based on the first pixel intensity data and the second pixel intensity data, fifth pixel intensity data using a second weight value that is lower than the first weight value.

12. The computer-implemented method of claim 5, further comprising:

determining a second portion of the first image data, the second portion including a second plurality of pixels including the first pixel;

determining a second confidence value for the second portion, the second confidence value corresponding to a probability that at least a portion of a human is represented in the second plurality of pixels;

determining a first aggregate confidence value corresponding to the first pixel, the first aggregate confidence value being a sum of the first confidence value and the second confidence value;

determining, based on the first aggregate confidence value, the first pixel intensity value;

determining a peak pixel intensity value corresponding to a highest pixel intensity value in the third pixel intensity data;

determining that the peak pixel intensity value is above a detection threshold value; and determining that at least a portion of a human is represented in the first image data.

13. A device comprising:

at least one processor; and memory including instructions operable to be executed by the at least one processor to perform a set of actions to configure the device to:

receive first image data;

determine a first portion of the first image data, the first portion including a first plurality of pixels including a first pixel;

determine a first confidence value for the first portion, the first confidence value corresponding to a probability that at least a portion of a human is represented in the first portion;

determine, based on the first confidence value, first pixel intensity data, the first pixel intensity data including a first pixel intensity value corresponding to the first pixel;

receive second pixel intensity data to remove from the first pixel intensity data, the second pixel intensity data corresponding to reference values;

determine, based on the second pixel intensity data, a second pixel intensity value corresponding to the first pixel;

determine third pixel intensity data, the third pixel intensity data including a third pixel intensity value determined by subtracting the second pixel intensity value from the first pixel intensity value; and determine, based on the third pixel intensity data, that human presence is represented in the first image data.

14. The device of claim 13, wherein the device is further configured to:

determine that the first pixel does not represent a portion of a human;

determine, based on the first pixel intensity value and the second pixel intensity value, a fourth pixel intensity value; and replace the second pixel intensity value in the second pixel intensity data with the fourth pixel intensity value.

15. The device of claim 13, wherein the device is further configured to:

select, from a preprogrammed set of weight values, a first weight value associated with the first pixel intensity data;

select, from the preprogrammed set of weight values, a second weight value associated with the second pixel intensity data;

determine a first product of the first pixel intensity value and the first weight value;

determine a second product of the second pixel intensity value and the second weight value;

determine a fourth pixel intensity value by summing the first product and the second product; and replace the second pixel intensity value in the second pixel intensity data with the fourth pixel intensity value.

16. The device of claim 15, wherein the device is further configured to:

determine a frame rate associated with the first image data;

determine, based on the frame rate, the first weight value, a higher frame rate corresponding to a lower value of the first weight value relative to a lower frame rate; and determine the second weight value by subtracting the first weight value from a value of one.

17. The device of claim 13, wherein the device is further configured to:

detect motion in the first image data;

determine a first plurality of pixels associated with the detected motion;

determine a second plurality of pixels that are not associated with the detected motion;

determine a second pixel included in the second plurality of pixels;

determine a fourth pixel intensity value in the first pixel intensity data, the fourth pixel intensity value corresponding to the second pixel;

determine a fifth pixel intensity value in the second pixel intensity data, the fifth pixel intensity value corresponding to the second pixel;

determine, based on the fourth pixel intensity value and the fifth pixel intensity value, a sixth pixel intensity value; and replace the fifth pixel intensity value in the second pixel intensity data with the sixth pixel intensity value.

18. The device of claim 13, wherein the device is further configured to:

receive normalized pixel intensity data to remove from the first pixel intensity data, the normalized pixel intensity data corresponding to the reference values and are normalized to have values between zero and one;

receive a fourth pixel intensity value, the fourth pixel intensity value corresponding to a highest pixel intensity value associated with the normalized pixel intensity data; and generate the second pixel intensity data by multiplying the normalized pixel intensity data and the fourth pixel intensity value, a highest pixel intensity value of the second pixel intensity data corresponding to the fourth pixel intensity value.

19. The device of claim 13, wherein the device is further configured to:

detect motion in the first image data;

determine a first plurality of pixels associated with the detected motion;

determine a second plurality of pixels that are not associated with the detected motion;

determine, based on the second pixel intensity data and the first pixel intensity data associated with the second plurality of pixels, fourth pixel intensity data using a first weight value; and determine, based on the first pixel intensity data and the second pixel intensity data, fifth pixel intensity data using a second weight value that is lower than the first weight value.

20. The device of claim 13, wherein the device is further configured to:

determine a second portion of the first image data, the second portion including a second plurality of pixels including the first pixel;

determine a second confidence value for the second portion, the second confidence value corresponding to a probability that at least a portion of a human is represented in the second plurality of pixels;

determine a first aggregate confidence value corresponding to the first pixel, the first aggregate confidence value being a sum of the first confidence value and the second confidence value;

determine, based on the first aggregate confidence value, the first pixel intensity value;

determine a peak pixel intensity value corresponding to a highest pixel intensity value in the third pixel intensity data;

determine that the peak pixel intensity value is above a detection threshold value; and determine that at least a portion of a human is represented in the first image data.

* * * * *